(12) United States Patent
Ninan

(10) Patent No.: US 11,330,309 B2
(45) Date of Patent: May 10, 2022

(54) FOVIATION AND HDR

(71) Applicant: Dolby Laboratories Licensing Corporation, San Francisco, CA (US)

(72) Inventor: Ajit Ninan, San Jose, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 17/260,521

(22) PCT Filed: Jul. 15, 2019

(86) PCT No.: PCT/US2019/041879
§ 371 (c)(1),
(2) Date: Jan. 14, 2021

(87) PCT Pub. No.: WO2020/018458
PCT Pub. Date: Jan. 23, 2020

(65) Prior Publication Data
US 2021/0329316 A1    Oct. 21, 2021

Related U.S. Application Data

(60) Provisional application No. 62/699,583, filed on Jul. 17, 2018.

(30) Foreign Application Priority Data

Sep. 17, 2018 (EP) ..................... 18194859

(51) Int. Cl.
*H04N 21/2343* (2011.01)
*H04N 21/442* (2011.01)

(52) U.S. Cl.
CPC ............... *H04N 21/234345* (2013.01); *H04N 21/44218* (2013.01)

(58) Field of Classification Search
CPC ..... H04N 21/234345; H04N 21/44218; G09G 2340/0407
See application file for complete search history.

(56) References Cited

U.S. PATENT DOCUMENTS

| 9,124,808 B2 | 9/2015 | Byren |
| 2010/0056274 A1 | 3/2010 | Uusitalo |

(Continued)

FOREIGN PATENT DOCUMENTS

| WO | 2011102887 | 8/2011 |
| WO | 2015130797 | 9/2015 |
| WO | 2017015564 | 1/2017 |

OTHER PUBLICATIONS

Avraham, T. et al. "Ultrawide Foveated Video Extrapolation" IEEE J. Selected Topics in Signal Processing, vol. 5, #2, pp. 321-334, Apr. 2011.

(Continued)

*Primary Examiner* — Fernando Alcon

(57) ABSTRACT

First foviated images are streamed to a streaming client. The first foviated images with first image metadata sets are used to generate first display mapped images for rendering to a viewer at first time points. View direction data is collected and used to determine a second view direction of the viewer at a second time point. A second foviated image and a second image metadata set are generated from a second HDR source image in reference to the second view direction of the viewer and used to generate a second display mapped image for rendering to the viewer at the second time point. The second image metadata set comprises a display management metadata portions for adapting a focal-vision and peripheral-vision image portions to corresponding image portions in the second display mapped image. The focal-vision display management metadata portion is generated with a predicted light adaptation level of the viewer for the second time point.

(Continued)

The second foviated image and the second image metadata set are transmitted to the video streaming client.

19 Claims, 14 Drawing Sheets

(56) References Cited

U.S. PATENT DOCUMENTS

| | | |
|---|---|---|
| 2016/0335778 A1 | 11/2016 | Smits |
| 2017/0011492 A1 | 1/2017 | Thunstroem |
| 2017/0236252 A1 | 8/2017 | Nguyen |
| 2017/0263046 A1 | 9/2017 | Patney |
| 2018/0081178 A1 | 3/2018 | Shpunt |
| 2018/0176535 A1 | 6/2018 | Ninan |
| 2018/0227630 A1* | 8/2018 | Schmidt ............. H04N 21/4223 |
| 2018/0302556 A1* | 10/2018 | Baran ............ H04N 21/234363 |

OTHER PUBLICATIONS

Pajak, D. et al. "Visual Maladaptation in Contrast Domain" Imaging XV, Feb. 18, 2010, pp. 1-12.
Swafford, N. et al. "User, Metric, and Computational Evaluation of Foveated Rendering Methods" Online Submission, pp. 1-18, Jul. 2016.
Weier, M. et al. "Perception-Driven Accelerated Rendering" Eurographics, vol. 36, No. 2, May 23, 2017, pp. 1-33.

\* cited by examiner

```
┌─────────────────────────────────────────┐
│ render, to a viewer, first display mapped images at │
│           first time points 452         │
└─────────────────────────────────────────┘
                    │
┌─────────────────────────────────────────┐
│ collect, in real time, view direction data of of the │
│                viewer 454               │
└─────────────────────────────────────────┘
                    │
┌─────────────────────────────────────────┐
│  send the view direction data to the video │
│         streaming server 456            │
└─────────────────────────────────────────┘
                    │
┌─────────────────────────────────────────┐
│ receive the second foviated image and the second │
│  image metadata set from the video streaming │
│                server 458               │
└─────────────────────────────────────────┘
                    │
┌─────────────────────────────────────────┐
│ generate the second display mapped image from │
│      the second foviated image 460      │
└─────────────────────────────────────────┘
                    │
┌─────────────────────────────────────────┐
│ render at the second time point, to the viewer, the │
│      second display mapped image 462    │
└─────────────────────────────────────────┘
```

FIG. 4B

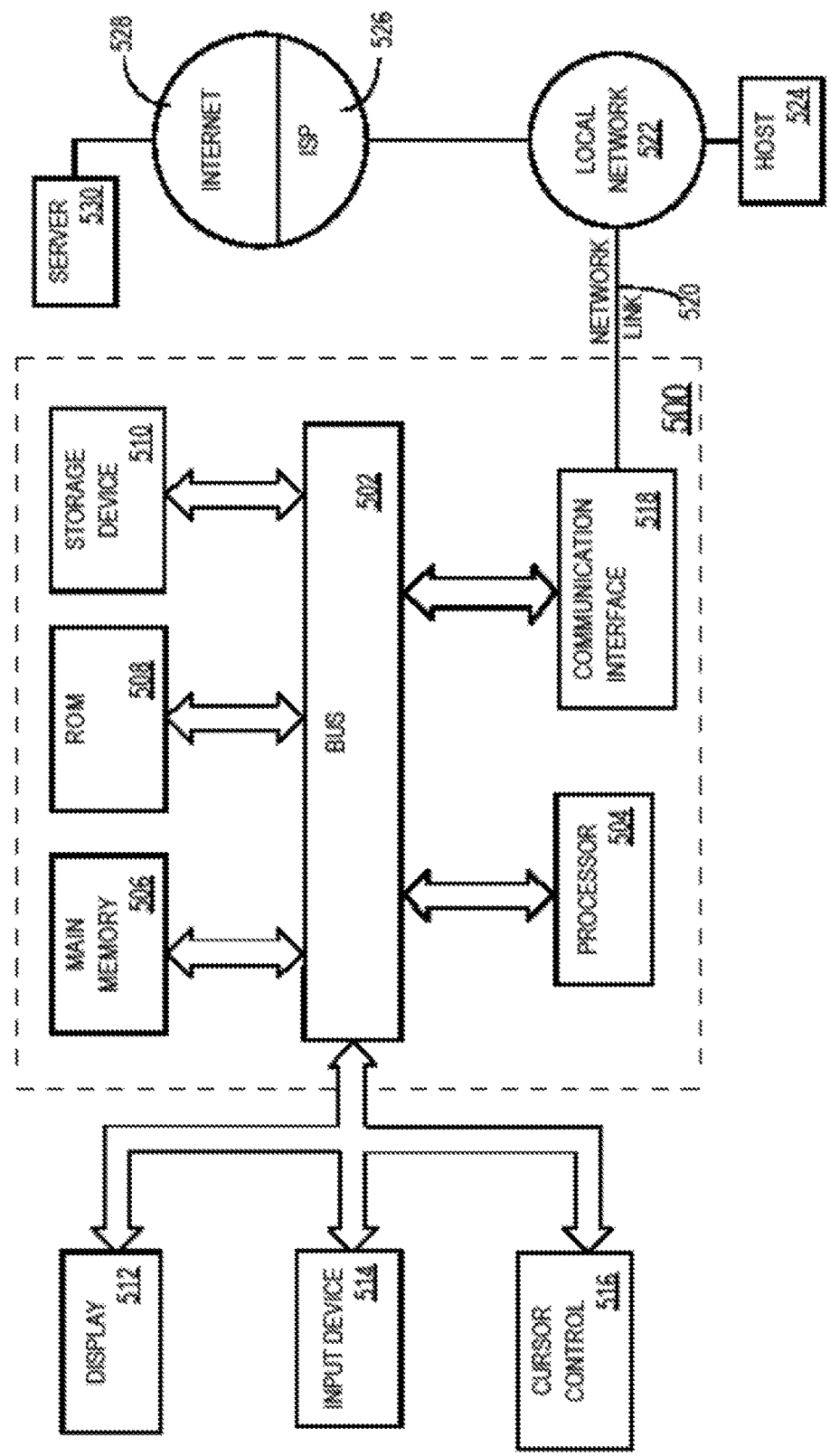

FOVIATION AND HDR

CROSS-REFERENCE TO RELATED APPLICATION(S)

This application claims the benefit of priority to U.S. Provisional Patent Application No. 62/699,583, filed Jul. 17, 2018, and to European Patent Application No. 18194859.7, filed Sep. 17, 2018, both of which are hereby incorporated by reference in their entirety.

TECHNOLOGY

The present invention relates generally to image coding and rendering, and in particular, to image coding related to foviation and high dynamic range (HDR).

BACKGROUND

A large amount of video data may be sent in real time to client devices to support a high-quality seamless user experience in a video related application such as augmented reality, virtual reality, remote presence application, immersive video application, etc. It may be difficult, and even impractical, to stream a large amount of video data to a wide variety of client devices and/or display devices in many existing network infrastructures, given the amount of bandwidth and computing power required to compress and decompress the video data.

In addition, a large amount of video data and video processing involved in a video application can cause significant time lags (e.g., longer than 12-15 milliseconds, etc.) to frequently occur between a first time when a user directs the user's field of view (FOV) and a second later time when high quality image content rendered in the user's FOV. Such time lags may be readily perceived by the user, thereby adversely impacting user experience qualities.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which:

FIG. 4A and FIG. 4B illustrate example process flows; and

FIG. 5 illustrates an example hardware platform on which a computer or a computing device as described herein may be implemented.

DESCRIPTION OF EXAMPLE EMBODIMENTS

Figure 1:
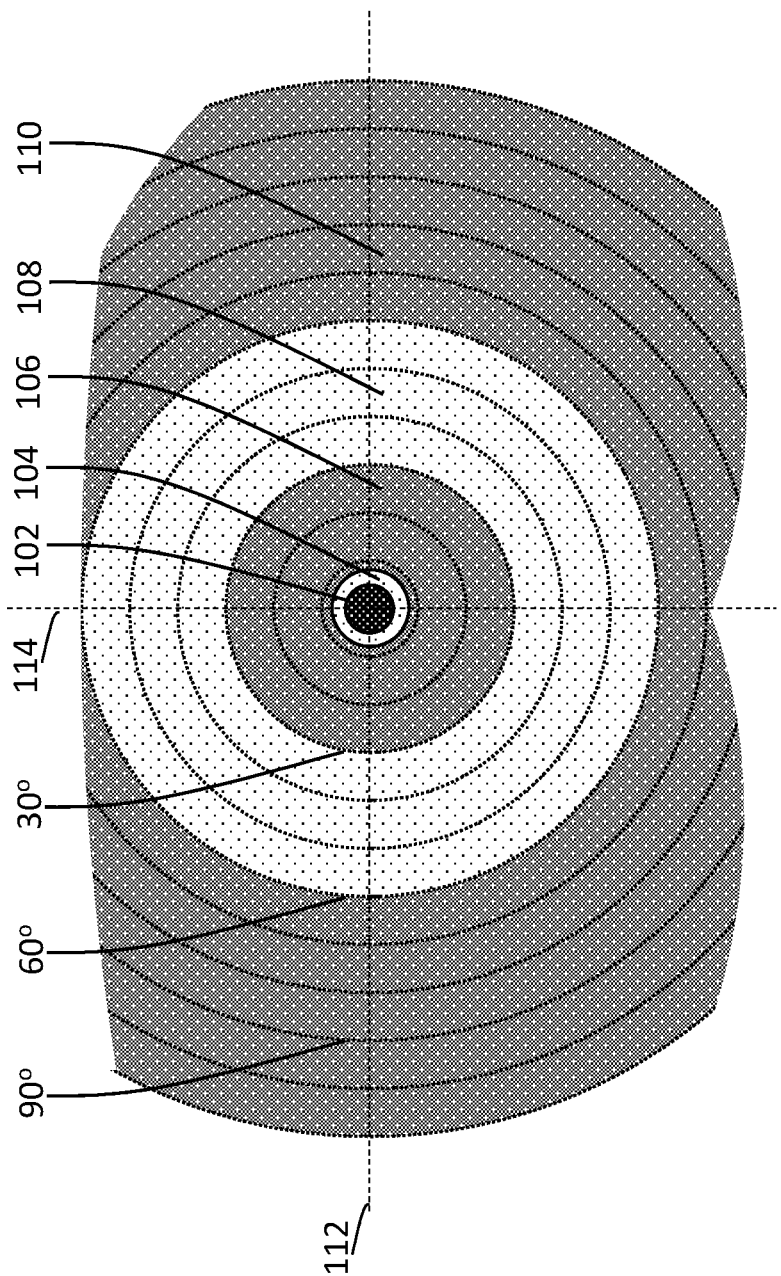
FIG. 1 illustrates an example angular vision field representation of an average viewer's eye.

Example embodiments, which relate to foviation and HDR, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:
1. GENERAL OVERVIEW
2. THE HUMAN VISION FIELD
3. VIEW DIRECTION TRACKING
4. FOVIATED IMAGES
5. LIGHT ADAPTION LEVELS
6. SPATIALLY DIFFERENTIATED DISPLAY MAPPING
7. EXAMPLE VIDEO STREAMING SERVERS AND CLIENTS
8. EXAMPLE PROCESS FLOWS
9. IMPLEMENTATION MECHANISMS—HARDWARE OVERVIEW
10. EQUIVALENTS, EXTENSIONS, ALTERNATIVES AND MISCELLANEOUS

1. General Overview

This overview presents a basic description of some aspects of an example embodiment of the present invention. It should be noted that this overview is not an extensive or exhaustive summary of aspects of the example embodiment. Moreover, it should be noted that this overview is not intended to be understood as identifying any particularly significant aspects or elements of the example embodiment, nor as delineating any scope of the example embodiment in particular, nor the invention in general. This overview merely presents some concepts that relate to the example embodiment in a condensed and simplified format, and should be understood as merely a conceptual prelude to a more detailed description of example embodiments that follows below. Note that, although separate embodiments are discussed herein, any combination of embodiments and/or partial embodiments discussed herein may be combined to form further embodiments.

Techniques as described herein can be implemented in various video applications to remap viewport-wide, image-wide and/or display-wide dynamic ranges (e.g., a dynamic range applied to the entire video image, a dynamic range applied to the entire viewport, a dynamic range applied to the entire target display, etc.) of HDR source images to foveal-vision dependent dynamic ranges of foviated images. Each of the foviated images is generated from a corresponding HDR source image in the HDR source images based on a viewer's view direction determined or predicted for a corresponding time point. Each of the foviated images comprises a foveal-vision image portion of a foveal-vision dynamic range that preserves or closely approximates the high dynamic range in a corresponding HDR source image and one or more non-foveal-vision image portions of nonfoveal-vision dynamic range(s) compressed or downsampled from the high dynamic range in the corresponding HDR source image.

As used herein, the term "preserve" or "closely approximate" may mean that a foveal-vision image portion (e.g., 2 to 4-degree radius around the viewer's view direction, etc.) in a foviated image has a dynamic range having a comparable total number of grayscale levels to represent image details with comparable grayscale level differences, etc., as compared with a total number of grayscale levels to represent corresponding image details with grayscale level differences, etc., in a corresponding image portion in a corresponding HDR source image used to derive the foviated image.

A video application as described herein may refer to any of: video display applications, VR applications, AR applications, automobile entertainment applications, remote presence applications, display applications, etc.

The techniques can be applied to minimize bandwidth usage for streaming video data between video streaming server(s) and video streaming client(s). Example video content may include, but are not necessarily limited to, any of: audiovisual programs, movies, video programs, TV broadcasts, computer games, augmented reality (AR) content, virtual reality (VR) content, automobile entertainment content, etc. Example video streaming clients may include, but are not necessarily limited to, any of: display devices, a computing device with a near-eye display, a head-mounted display (HMD), a mobile device, a wearable display device, a set-top box with a display such as television, a video monitor, etc.

As used herein, a "video streaming server" may refer to one or more upstream devices that prepare and stream video content to one or more video streaming clients in order to render at least a portion (e.g., corresponding to a user's FOV or viewport, etc.) of the video content on one or more (target) displays. The displays on which the video content is rendered may be part of the one or more video streaming clients or may be operating in conjunction with the one or more video streaming clients. Example video streaming servers may include, but are not necessarily limited to, any of: cloud-based video streaming servers located remotely from video streaming client(s), local video streaming servers connected with video streaming client(s) over local wired or wireless networks, VR devices, AR devices, automobile entertainment devices, digital media devices, digital media receivers, set-top boxes, gaming machines (e.g., an Xbox), general purpose personal computers, tablets, dedicated digital media receivers such as the Apple TV or the Roku box, etc.

Compressed video content such as foviated images can be transmitted along with spatially varying dynamic range remapping metadata with an overall low bandwidth. The spatially varying dynamic range remapping metadata can be used by a recipient device to remap the foviated images to display mapped images that support human perceptions of high dynamic ranges in the viewer's foveal vision wherever the (human) viewer directs view directions. The viewer's view directions can be tracked by any combination of view direction tracking methods including but not limited to gaze tracking, viewport tracking, FOV tracking, viewer position tracking, face tracking, or any other view direction tracking methods.

View direction data to track the viewer's view directions is collected while the viewer is viewing the displayed images remapped from the foviated images. Example view direction data may include, without limitation, linear displacements, angular displacements, linear motions or translations, angular motions or rotations, pitch, roll, yaw, sway, heave, surge, up to six degrees of freedom, etc., that may be collected by any combination of gaze tracking devices, position tracking devices, viewport tracking devices, face tracking devices, FOV tracking devices, etc. The viewer's view directions at a plurality of time points may be determined. The viewer's view directions can be (e.g., additionally, optionally, alternatively, etc.) used on the recipient device itself to generate new views until the upstream devices respond with new data. The viewer's view directions can also be fed back to upstream devices to generate, from HDR source images, specific foviated images in reference to the viewer's view directions with different levels of image details in grayscale levels and/or colors and/or spatial resolutions. Instead of sending the HDR source images with large data volumes, the specific foviated images generated in reference to the viewer's view directions, which amount to much less data volumes than the large data volumes of the HDR source images, are sent to the viewer's display device for rendering.

As used herein, a foviated image refers to an image in which only a very tiny region or image portion covering the viewer's vision field (e.g., sufficiently covering the viewer's foveal-vision, covering 10% more than the viewer's foveal-vision, covering 5% more than the viewer's foveal-vision, etc.) is given image data of the finest image details (e.g., highest dynamic range, finest gray scale levels, highest color accuracies, highest spatial resolutions, etc.) while image data covering other regions of the viewer's vision field can be (e.g., greatly, etc.) compressed and/or downsampled in levels of image details in dynamic ranges, grayscale levels and/or color accuracies/precisions and/or spatial resolutions.

Based on where the viewer is currently viewing, spatially differentiated remapping of dynamic ranges may be performed by a video streaming server on image portions (e.g., corresponding to a foveal-vision image portion, corresponding to one or more non-foveal-vision image portions, etc.) in an HDR source image to generate a foviated image. The foviated image includes a foveal-vision image portion of a relatively tiny size, for example sufficient to cover a 2-degree radius, a 4-degree radius, comparable or slightly greater the viewer's foveal vision, etc., around the viewer's view direction. The dynamic range in the foveal-vision image portion of the foviated image may be optimized or preserved to a maximum possible extent based on maximum and minimum luminance values in a corresponding image portion of the HDR source image, whereas dynamic ranges in non-foveal-vision image portions of the foviated image may be reduced or crushed so that luminance values present corresponding image portions of the HDR source image may or may not be preserved in the foviated image. For example, to reduce bandwidth usages, dynamic ranges in (e.g., specific to, etc.) the non-foveal-vision image portion may be clipped or greatly compressed in the foviated image.

For a bright image detail (or pixels) present in the foveal-vision image portion of the foviated image, dynamic range remapping in connection with generating the foveal-vision image portion may maximize the peak luminance value (e.g., 4000 nits or even more, etc.) in the dynamic range of the foveal-vision image portion to the maximum possible extent supported by a target display (e.g., a 4000-nit display, etc.). On the other hand, for a bright image detail present in a non-foveal-vision image portion such as a peripheral-vision image portion, dynamic range remapping in connection with generating the non-foveal-vision image portion may not maximize the peak luminance value in the dynamic range of the non-foveal-vision image portion to the maximum possible extent supported by a target display; rather, luminance values of the bright image detail in the HDR source image may be set to a clipped luminance value if necessary. Additionally, optionally or alternatively, for a bright image detail present in an image portion outside the foveal-vision image portion and the peripheral-vision image portion, dynamic range remapping in connection with generating the other image portion may clip luminance values of the bright image detail in the HDR source image to a clipped luminance value even lower than the clipped luminance value in the peripheral luminance value.

As previously noted, dynamic range remapping of an HDR source image to a foviated image as described herein may vary from region to region for different image portions of the HDR source image and the foviated image depending on whether the dynamic range remapping is performed in the viewer's foveal vision, in the viewer's peripheral vision field, outside the viewer's vision field, etc.

In addition to dynamic ranges remapping, spatially varying resolution remapping may also be implemented. By way of example but not limitation, the viewer's iris can control the diameter and size of the pupil to reduce the amount of light reaching the retina when the viewer is looking at bright image details (e.g., looking at or near the sun, etc.). The reduction of the pupil in diameter and size may decrease the viewer's vision power in terms of visually resolving or distinguishing different points that are nearby. Thus, when the viewer is viewing bright image details, non-foveal vision image portions may be encoded with image data of downsampled spatial resolutions, while the foveal vision image portion may still be encoded with image data of maximum available spatial resolutions. In some operational scenarios, the entire image may be encoded with less spatial resolution in response to determining that the viewer is not capable of perceiving overly high spatial resolutions at a given time.

The viewer's view directions may move around in a scene such as a consecutive sequence of images, for example from viewing a first image detail (in a previous image of the scene) with a first brightness level to viewing a second image detail (in a present image of the scene) with a second different brightness level. The viewer's eye may not be able to instantly adjust to the second brightness level when viewing the second image detail, as the viewer may still be adapted to a previous brightness level such as the first brightness level. Based on the average light level of a zone around the viewer's view direction over time, a light adaptation level of the viewers can be estimated, predicted, or determined based at least in part on eye characteristics of adaptation, director input, target display characteristics, etc.

To predict or estimate the viewer's light adaptation level at a given time, a light adaptation curve (or a light adaptation curve family) may be used to take into account a number of input factors indicating which source zone the viewer was viewing, which intermediate zones the viewer has been transitioning, which target zone the viewer is currently viewing or is predicted to be currently viewing, etc. Example input factors may include, without limitation, eye characteristics of adaptation, director input, target display characteristics, etc. View tracking data may be used to determine some or all of these input factors in the light adaptation curve to determine, estimate or predict the viewer's light adaptation level at a given time. For example, the viewer's eye movements as monitored through the viewer's view track data may be used to set or determine values of some or all operational parameters in the light adaptation curve.

Instantaneous flashes, pulsating or abrupt changes in light levels of the viewer's peripheral vision may be dampened or smoothened in some circumstances. Dynamic range remapping of image portions in the viewer's peripheral vision may implement a smoothening process to allow light levels in the viewer's peripheral vision to smoothly transition (e.g., relatively slowly go up, relatively slowly go down, etc.) during an adaptation time (e.g., 2 seconds, 5 second, 10 seconds, an amount of time depending at least in part on the beginning and ending light levels, etc.). In an example, some or all image portions may go through the same or similar transitioning process(es) over the adaptation time; the view's entire target display(s) may concurrently undergo same or similar light level adjustment processes over time. In another example, different image portions may concurrently undergo different light level adjustment processes over time.

Artistic intent (or director intent) may be incorporated in video rendering operations in connection with light level adjustments. In an example, when the viewer moves view direction(s) to look at a dark region, the details in the dark region may not emerge (or may not be rendered) only after a certain specific time as indicated by user input representing the artistic intent. In another example, the details in the dark region may be rendered while rendering the details in the surrounding regions may be delayed only after a certain specific time.

Techniques as described herein can be used to allow a user of a downstream recipient device to freely vary the user's viewing angles or fields of view to display mapped images generated from foviated images from the video streaming server. In most if not all operating scenarios, the user can be presented with focal-vision video content with the finest image details for a seamless viewing experience that is relatively free from visual artifacts, physiological discomforts, etc., associated with some other approaches that do not adopt the techniques as described herein. The visual artifacts, physiological discomforts, etc., associated with the other approaches may include, but are not necessarily limited to, any of: motion artifacts such as unable to maintain smooth pursuit, prolonged lags in transitioning to fine image details as perceived by the human vision, coarse image details noticeable within a focal viewing area of the human vision, mismatches between a user's natural vision-related intuition and video content as actually rendered to the user, sudden drop of levels of image details when a viewer moves viewing angles, perceptible slow transitioning from coarse image details to fine image details, showing fuzzy images for previously occluded image details when a viewer moves viewing angles, etc.

View-direction-based video application as described herein can be extended to support multiple viewers (or users). For example, view directions of each of the multiple viewers may be respectively tracked and/or determined by a view direction tracker in the form of a bar in front of a television. The multiple viewers may be concurrently attracted to the same image detail or several different image details. A foviated image may be generated in reference to all viewers' view directions predicated for a time point at which the foviated image is to be rendered. The foviated image comprises a foveal-vision image portion with the highest dynamic range, finest image details, highest color precisions, finest spatial resolutions, etc., for each of the multiple viewers. In scenarios in which the multiple viewers are viewing at least two different image details, the foviated image may comprise at least two foveal-vision image portions respectively corresponding to the at least two different image details. Peripheral-vision image portions of the multiple viewers may be set to an average dynamic range based on light adaptation levels of the multiple viewers. Instantaneous flashes, pulsating or abrupt changes in light levels of the multiple viewers' peripheral visions may be dampened or smoothened in some circumstances. Additionally, optionally or alternatively, view directions of a selected (e.g., representative, etc.) viewer, who may or may not be one in a group of one or more viewers, may be tracked and/or determined. The selected viewer's view direction may be indicative of an interesting image detail. A foviated image may be generated in reference to the selected viewer's view direction and rendered to the group of viewers with the foviated image. Accordingly, the amount of video content to be streamed between a video streaming server and a video streaming client can be reduced or minimized in single-viewer operational scenarios as well as in multiple-viewer operational scenarios, thereby reducing or minimizing the need for using a relatively large bandwidth budget to stream video content and efficiently supporting a wide variety of video streaming applications to a wide variety of downstream devices.

Spatially differentiated display management (DM or SDDM) metadata portions may be generated for different image portions in a foviated image as described herein. A recipient video decoding device that receives the foviated image and the DM metadata portions can use the DM metadata portions to perform respective display mapping or display management (DM) operations on the image portions of the foviated image to generate a display mapped image to be rendered on one or more target displays operating in conjunction with the recipient video decoding device.

A display mapped image adapted from a foviated image based on spatially differentiated DM metadata can be rendered on any target display in a wide variety of target displays. Example target displays may include, without limitation, global-dimming displays, low-count dimming displays, local dimming displays, displays with light direction capabilities, displays with overdrive/underdrive capabilities, displays with phase-based light modulation capabilities, etc.

Phase-based light modulation may also be used to direct light accurately to one or more specific spots in a display mapped image as described herein. Instead of wasting unused energy on image locations/regions that do not need bright luminances, energy or light from these image locations/regions can be redistributed to any given location in a target display with phase-based light modulation capabilities to generate very high brightness levels accurately at these specific spots.

In some example embodiments, mechanisms as described herein form a part of a media processing system, including but not limited to any of: cloud-based server, mobile device, virtual reality system, augmented reality system, head up display device, helmet mounted display device, CAVE-type system, wall-sized display, video game device, display device, media player, media server, media production system, camera systems, home-based systems, communication devices, video processing system, video codec system, studio system, streaming server, cloud-based content service system, a handheld device, game machine, television, cinema display, laptop computer, netbook computer, tablet computer, cellular radiotelephone, electronic book reader, point of sale terminal, desktop computer, computer workstation, computer server, computer kiosk, or various other kinds of terminals and media processing units.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2. The Human Vision Field

Techniques as described herein can be implemented based on the knowledge of the (human) eye and how the eye perceives luminance, colors, spatial resolution, etc. These techniques may be applied based on the individual viewer's specific vision characteristics or a user population's average or collective vision characteristics.

FIG. 1 illustrates an example representation of a vision field of an average viewer's eye. Cone and rod distributions (in the eye) can be segmented into different distribution ranges of cones and rods and further projected into an angular vision field representation (of the eye) as illustrated in FIG. 1. Highest levels of visual perception are achieved in the eye's foveal (vision field) region 102.

By way of example but not limitation, the widest angular range in the eye's vision field is along the horizontal direction of FIG. 1, which is parallel to the inter-pupil line between the viewer's two eyes, without considering visual constraints from facial anatomy, and may be approximately 180 angular degrees.

Each of concentric circles (e.g., labelled as 30°, 60°, 90°, etc.) represents directions of equal (or the same) angular degree relative to a view direction of the viewer's left or right eye. It should be noted that angles such as 30°, 60°, 90°, etc., are for illustration purposes only. Different values of angles or different set of angles can be used to define or describe a viewer's vision field. The view direction (not shown in FIG. 1) is pointed vertically out of the plane of FIG. 1 at the intersection of a transverse direction 112 and a vertical direction 114 in a foveal region 102 (the darkest fill pattern). Here, the transverse direction (112) and the vertical direction (114) form a plane vertical to the view direction.

As illustrated in FIG. 1, the vision field of the eye may be partitioned (e.g., logically, projected by certain partitions in the distributions of densities of rods/cones, etc.) into the foveal region (102) immediately surrounded by a paracentral region 104. In some embodiments, the foveal region (102) may correspond to the viewer's fovea vision and extend from zero (0) angular degree to a first angle (e.g., 2-4 angular degree, 3-7 angular degrees, 5-9 angular degrees, etc.) relative to the view direction. In some embodiments, the paracentral region (104) may extend from the first angle to a second angle (e.g., 6-12 angular degrees, etc.) relative to the view direction.

The paracentral region (104) is immediately surrounded by a near-peripheral region 106. The near-peripheral region (106) is immediately adjacent to the mid-peripheral region (108), which in turn is immediately adjacent to the rest of the vision field, a far-peripheral region 110. In some embodiments, the near-peripheral region (106) may extend from the second angle to a third angle (e.g., 25-35 angular degrees, etc.) relative to the view direction. In some embodiments, the mid-peripheral region (108) may extend from the third angle to a fourth angle (e.g., 50-65 angular degrees, etc.) relative to the view direction. The far-peripheral region (110) may extend from the fourth angle to the edge of the vision field.

The first, second, third and fourth angles used in this example logical partition of the vision field may be defined or specified along the transverse direction (112). When the vision field of FIG. 1 corresponds to that at a front level viewing direction, the transverse direction (112) may be the same as, or parallel to, the viewer's interpupil line.

It should be noted that different schemes of logically partitioning a viewer's vision field may be used in addition to, or in place of, the scheme of logically partitioning the viewer's vision field into foveal, paracentral, near-peripheral, mid-peripheral, far-peripheral, etc., regions based on angles as illustrated in FIG. 1.

For example, in some embodiments, the viewer's vision field may be partitioned into more or fewer regions such as a combination of a foveal region, a near-peripheral region and a far-peripheral region, etc., without a paracentral region and/or a mid-peripheral region. An HDR image portion may be used to cover from the foveal region up to some or all of the near-peripheral region in such logical partition of the viewer's vision field.

In some embodiments, the viewer's vision field may be partitioned based on other quantities other than angles as illustrated in FIG. 1. For example, in a non-limiting implementation, the foveal region may be defined as a vision field region that corresponds a viewer's foveal-vision. The paracentral region may be defined as a vision field region that corresponds a viewer's retina area where cone/rod densities exceed relatively high cone/rod density thresholds. The near-peripheral region may be defined as a vision field region that corresponds a viewer's retina area where cone/rod densities does not exceed relatively high cone/rod density thresholds respectively but does exceed intermediate cone/rod density thresholds. The mid-peripheral region may be defined as a vision field region that corresponds a viewer's retina area where cone/rod densities does not exceed intermediate cone/rod density thresholds respectively but does exceed relatively low cone/rod density thresholds. A focal-vision region as described herein may cover from the viewer's foveal-vision up to some or all of a region (e.g., some or all of the viewer's near-peripheral vision, etc.) based on threshold(s) (e.g., cone/rod density threshold(s), etc.) that are not necessarily angle-based.

Additionally, optionally or alternatively, a combination of two or more different schemes of logically partitioning the viewer's vision field and/or other human vision factors may be used to determine a focal-vision region of the viewer's vision field. For example, instead of using a focal-vision region as described herein to cover the same angular value range in different angular directions, the focal-vision region as described herein may cover a larger angular value range along the transverse direction (112) than an angular value range covered by the focal-vision region along the vertical direction (114), as the human vision system may be more sensitive to image details along the transverse direction (112) than those along the vertical direction (114).

In some embodiments, a focal-vision region as described herein covers some or all of: a foveal region (e.g., plus a safety margin, etc.), a paracentral region (e.g., excluding and extending from the foveal region, etc.), a near-peripheral region (e.g., further excluding and extending from the paracentral region, etc.), a mid-peripheral region (e.g., further excluding and extending from the near peripheral region, etc.), etc.

In some embodiments, a focal-vision region as described herein covers a symmetric angular range representing a symmetric (to the viewer's view direction) region of the wide angular range. Examples of the focal-vision region may include, but are not necessarily limited to, one of: +/−15 angular degrees, +/−20 angular degrees, +/−25 angular degrees, etc., relative to the viewer's view direction.

In some embodiments, a focal-vision region as described herein covers an asymmetric angular range representing an asymmetric (to the viewer's view direction) region of the wide angular range. An asymmetric angular range in a vision field of one eye may be defined or specified as covering from an interior angle (looking towards the other/conjugate eye) to an exterior angle (looking away from the other/conjugate eye).

In some implementation examples, the asymmetric angular range is biased with a preference towards interior directions overlapped in both vision fields of the viewer's left and right eyes. Examples of the interior angle of the asymmetric angular range with bias to interior angles may include, but are not necessarily limited to, one of: 15 angular degrees, 30 angular degrees, 45 angular degrees, etc., relative to the viewer's view direction. Examples of the exterior angle of the asymmetric angular range with bias to interior angles may include, but are not necessarily limited to, one of: 10 angular degrees, 15 angular degrees, 20 angular degrees, etc., relative to the viewer's view direction.

In some implementation examples, the asymmetric angular range is biased with a preference towards exterior directions which may or may not be overlapped in both vision fields of the viewer's left and right eyes. Examples of the exterior angle of the asymmetric angular range with bias to exterior directions may include, but are not necessarily limited to, one of: 15 angular degrees, 30 angular degrees, 45 angular degrees, etc., relative to the viewer's view direction. Examples of the interior angle of the asymmetric angular range with bias to exterior directions may include, but are not necessarily limited to, one of: 10 angular degrees, 15 angular degrees, 20 angular degrees, etc., relative to the viewer's view direction.

Additionally, optionally or alternatively, in some embodiments, a vision field of an eye as described herein takes into consideration vision-related factors such as eye swiveling, viewing constraints from nose, corneal, eyelid, etc.

Examples of a focal-vision region as described herein may include, but are not necessarily limited to, any combination of one or more of: circular shapes, oblong shapes, oval shapes, heart shapes, star shapes, round shapes, square shapes, polygonal shapes, etc.

3. View Direction Tracking

In some embodiments, only a (e.g., relatively small, etc.) focal-vision region of the eye's vision field needs to be provided with pixel values with the highest dynamic range, the widest color gamut, the highest (or sharpest) spatial resolution, etc. In some embodiments, the focal-vision region of the eye's vision field may correspond to (e.g., exactly, approximately, no less than 95% of, no more than 105% of, etc.) the entirety of the foveal-vision of the eye up to some or all of near-peripheral vision of the eye. In some embodiments, the focal-vision region of the eye's vision field may additionally include a safety vision field region.

In some embodiments, the size and/or shape of the safety vision field region in the focal-vision region can be preconfigured to a fixed size (e.g., 0%, 5%, 10%, −5%, −10%, etc.) that does not vary with network bandwidth, image content, types of computing devices (e.g., helmet mounted display devices, small form factor computing devices such as credit card size plugin devices, wall displays, etc.) involved in video applications, types of rendering environments (e.g., cloud-based video streaming servers, video streaming servers collocated with video streaming clients, video streaming servers connected with video streaming clients over local wireless connections, etc.) involved in video applications, etc.

In some other embodiments, the size and/or shape of the safety vision field region in the focal-vision region can be dynamically reconfigured at runtime, and can vary in a range (e.g., from −10% to 10%, from −5% to 5%, from 0% to 5-10%, etc.) with one or more of: network bandwidth, image content, types of computing devices (e.g., helmet mounted display devices, small form factor computing devices such as credit card size plugin devices, wall displays, etc.) involved in video applications, types of rendering environments (e.g., cloud-based video streaming servers, video streaming servers collocated with video streaming clients, video streaming servers connected with video streaming clients over local wireless connections, etc.) involved in video applications, etc.

For example, in response to determining that network connections do not support a relatively high bandwidth, the size and/or shape of the safety vision field region may be dynamically shrunk at runtime from 10% to 5% over the eye's foveal-vision. On the other hand, in response to determining that network connections do not support a relatively high bandwidth, the size and/or shape of the safety vision field region may be dynamically expanded at runtime from 5% to 10% over the eye's foveal-vision.

The size and/or shape of the safety vision field region may also be set in dependence on latency in eye tracking. For example, the user's view direction at runtime may be tracked by a view direction tracking device. The view direction tracking device may operate in real time with a display on which a sequence of display mapped images is rendered. As the user changes view directions and/or viewing distances from time to time, the view direction tracking device tracks and computes the viewing angles and/or viewing distances in a coordinate system in which the sequence of display mapped images is being rendered, generates a time sequence of view directions, and signals each view direction in the time sequence of view directions to a video streaming server as described herein. Each such signaled view direction of the viewer as received by the video streaming server may be indexed by a time point value. The time point value may be associated or correlated by a video streaming server as described herein with a specific foviated image in a sequence of foviated images that are used by a video decoder to generate the sequence of display mapped images.

View direction data may be collected, analyzed and/or shared/transmitted among view direction tracking devices and streaming devices with relatively low latency (e.g., within a fraction of one image frame time, within 5 milliseconds, etc.). In an example implementation, the view direction tracking data may be shared among these devices using the lowest latency data/network connections where multiple data/network connections are available.

In response to determining the viewer's view direction relatively expeditiously with relatively low latency (e.g., within a fraction of an image frame time, etc.) based on the view direction data, a video streaming server (e.g., implemented with one or more upstream devices, etc.) may dynamically shrink the size and/or shape of the safety vision field region at runtime from 10% to 5% over the eye's foveal-vision. A relatively small area (e.g., within 20 angular degrees from the view direction, etc.) of the highest dynamic range, the widest color gamut, the highest spatial resolution, etc., may be sent in the video signal to the downstream recipient device.

On the other hand, in response to determining the viewer's view direction relatively slowly with relatively high latency (e.g., exceeding a time threshold, more than the fraction of one image frame time, longer than 5 milliseconds, etc.) based on the view direction data, the video streaming server may dynamically expand the size and/or shape of the safety vision field region at runtime from 1% to 3%, 2% to 6%, 5% to 10%, etc., over the eye's foveal-vision. A relatively large area (e.g., up to 30 angular degrees from the view direction, etc.) of the highest dynamic range, the widest color gamut, the highest spatial resolution, etc., may be sent in the video signal to the downstream recipient device. That way, the recipient device of the video signal can have sufficient image data over a relatively large focal-vision region to make local decisions based on the view directions for image rendering purposes.

HDR source images as described herein can be captured/generated with one or more camera systems deployed in one or more spatial environments. Example spatial environments may include, but are not limited to only, any of: physical spatial environment, simulated spatial environment, movie studios, outdoor scenes, indoor scenes, tunnels, streets, vehicles, ships, aircrafts, outer space, etc. Example camera systems may include, but are not limited to only, any of: light field cameras, multiple cameras with overlapping and/or non-overlapping fields of vision, digital cameras, analog cameras, webcams, etc.

As used herein, an HDR source image may represent one individual HDR source image in a sequence of HDR source images. A video streaming server may be configured to receive and use the received sequence of HDR source images as input to prepare foviated video content for streaming to (downstream) video streaming clients in support of one or more of: video display applications, VR applications, AR applications, automobile entertainment applications, remote presence applications, display applications, etc.

An image (e.g., an HDR source image, a foviated image, a display mapped image, etc.) as described herein can be represented in any of a wide variety of coordinate systems such as a World coordinate system, a coordinate system stationary to a camera system, a coordinate system fixed relative to a spatial environment, etc. A spatial position in the image may be either an absolute position (e.g., represented in the World coordinate system, etc.) or a relative position (e.g., represented in a relative coordinate system stationary to the camera system, etc.).

In some embodiments, a spatial position (e.g., a pixel, etc.) in the image can be represented by a set of specific (x, y) coordinate values. By way of example but not limitation, the x coordinate value of the specific (x, y) coordinate values may correspond to a specific longitudinal degree (ranging from 0 to 360 angular degrees) in the image representation in a 3D space, whereas the y coordinate value of the (x, y) coordinate values may correspond to a specific latitudinal degree (ranging from 0 to 180 angular degrees) in the image representation in the 3D space. In various embodiments, geometric transformations can be used to transform a set of (e.g., x, y) coordinate values of a spatial position in one image representation into another set of (e.g., pitch, roll, yaw, sway, heave, surge, etc.) coordinate values of the same position in other image representations, etc.

4. Foviated Images

Figure 2A:
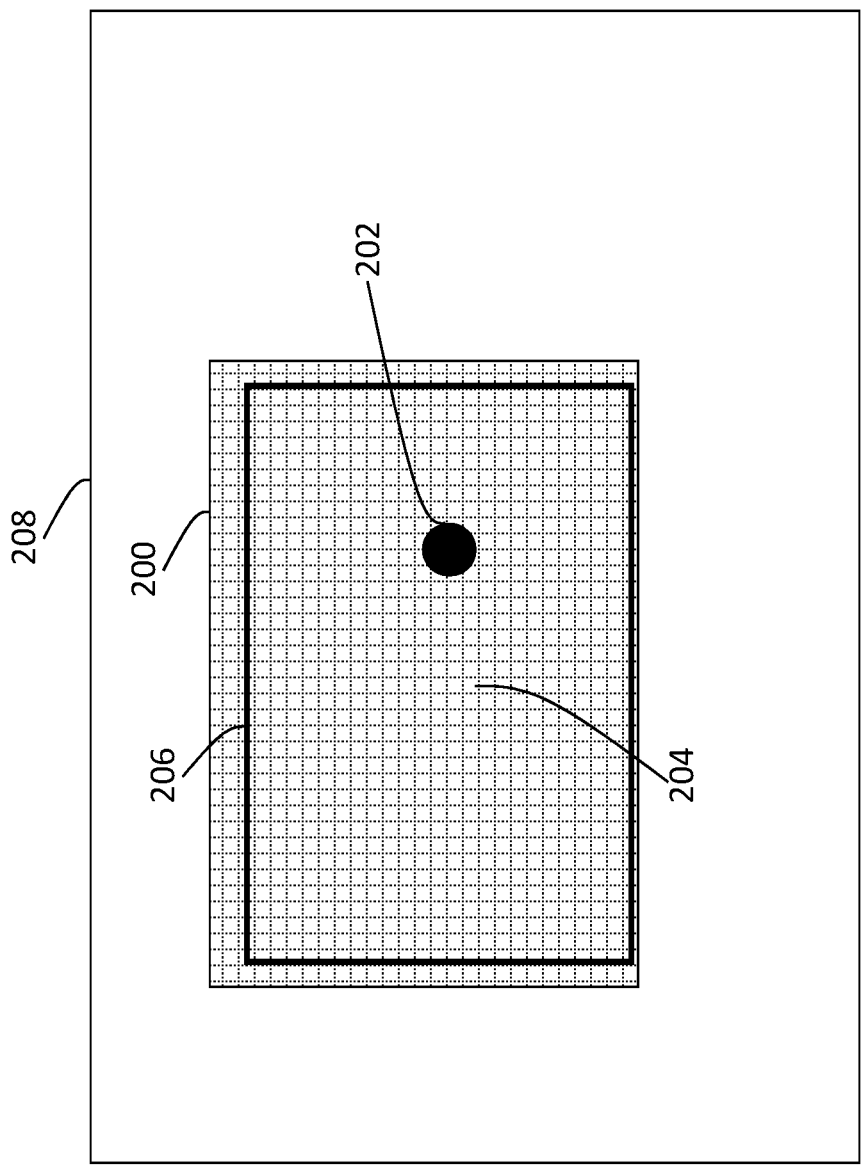
FIG. 2A and FIG. 2B illustrate example image portions in foviated images.

FIG. 2A illustrates an example foviated image 200 with HDR image content to cover a viewer's foveal-vision. The foviated image (200) comprises multiple image portions that are adapted from multiple corresponding image portions in a corresponding HDR source image. Image metadata comprising multiple display management (DM) metadata portions respectively for the multiple image portions in the foviated image may be generated. Instead of directly encoding the HDR source image, the foviated image (200) is encoded into a video signal that can be transmitted from one or more upstream devices (e.g., video streaming server(s), etc.) to a downstream recipient device (e.g., a video streaming client, etc.).

An image portion in an image as described herein may logically represent an image frame containing a set of pixel values at a set of pixels (or positions). Individual shapes (e.g., rectangle, polygonal shapes, regular shapes, irregular shapes, etc.) and individual sizes of image portions and/or corresponding buffers used to store the image portions may be reshaped or resized dynamically, for example, based on one or more of: network latencies, bandwidths, view direction movements, image content, etc. At the one or more upstream devices and/or at the recipient device, each image portion (or each image frame) in the foviated (200) may, but is not limited to only, be kept in a respective memory buffer in a plurality of memory buffers that stores the foviated image (200). In some embodiments, some or all of the memory buffers may be refreshed collectively with a common frame rate. In some embodiments, at least some of the memory buffers may be refreshed individually with their own frame rates. In some embodiments, image data in different memory buffers as described herein may be compressed collectively, individually or separately. In some embodiments, different memory buffers storing different image layers may be located in different computing devices of one or more content delivery networks, one or more content distribution networks, one or more core networks, one or more access networks, etc. For example, a memory buffer storing a focal-vision image portion of a foviated image representing the same video content of a corresponding HDR source image may be kept relatively close (e.g., geographically, in network topology, in the same network, in the same service-provider network, in an access network, via a local WIFI or wireline network/data connection, over relatively few network hops, etc.) to the recipient device. Another memory buffer storing a non-focal-vision image portion of the foviated image representing the same video content of the corresponding HDR source image may be kept relatively further way (e.g., geographically, in network topology, in different networks, in different service-provider networks, in a core network, via one or more remote network/data connections, over relatively numerous network hops, etc.) from the recipient device.

At the one or more upstream devices, the HDR source image received as input for generating the foviated (200) may be kept in a separate input HDR source image buffer. At the recipient device, a display mapped image generated from the foviated (200) may be kept in a separate display mapped image buffer. In some embodiments, the display mapped image buffer may be used to drive/render image content derived from the foviated image on the viewer's display device and may be refreshed at a device-specific frame rate of the viewer's display device.

The foviated image (200) may comprise a focal-vision image portion 202 that covers a focal-vision region of the eye's vision field. In some embodiments, the foveal-vision image portion (202) covers a focal-vision region (e.g., completely, substantially within a + or −5% safety margin, etc.) that corresponds to an innermost portion (e.g., 50%, 70%, 90%, etc.) of the viewer's foveal-vision. In some embodiments, the foveal-vision image portion (202) covers a focal-vision region (e.g., completely, substantially within a + or −5% safety margin, etc.) that corresponds to the viewer's foveal-vision and some or all of the viewer's near-peripheral vision.

Image data in the focal-vision image portion (202) may be cached and served out at a relatively high data rate to the downstream recipient device at upstream devices, content serving nodes, content caching nodes, etc., that are relatively close in spatial proximity or network topology proximity to the downstream recipient device. The focal-vision image portion may comprise pixel values of the highest dynamic range, the widest color gamut, the highest spatial resolution, etc., as transmitted in a video signal from one or more upstream devices (e.g., cloud-based video streaming server(s), a set-top box, a local video streaming server, any combination of one or more of the foregoing, etc.).

The foviated image (200) may comprise a peripheral-vision image portion 204 that cover a peripheral-vision region in the eye's vision field outside the focal-vision region. Image data in the peripheral-vision image portion (204) may be cached and served out at a relatively low data rate to the downstream recipient device at upstream devices, content serving nodes, content caching nodes, etc., that are relatively far in spatial proximity or network topology proximity to the downstream recipient device. The peripheral-vision image portion (204) may comprise pixel values of relatively low dynamic range(s), relatively narrow color gamut(s), relatively low spatial resolution(s), etc., as transmitted in the video signal from one or more upstream devices (e.g., cloud-based video streaming server(s), a set-top box, a local video streaming server, any combination of one or more of the foregoing, etc.).

In some embodiments, the focal-vision image portion (202) and the peripheral-vision image portion (204) may cover the viewer's viewport 206 of an image field (e.g., 208, etc.) of an HDR source image (not shown) used to generate the focal-vision and peripheral-vision image portions (202 and 204) in the foviated image (200-1) in reference to the viewer's view direction determined or predicted for the time point.

The HDR source image may comprise two HDR source image portions that respectively correspond to the focal-vision image portion (202) and the peripheral-vision image portion (204) as shown in FIG. 2A. One of the two HDR source image portions corresponds to (is capable of covering) the viewer's focal-vision region and is used or adapted to generate the focal-vision image portion (202). The other of the two HDR source image portions corresponds to (is capable of covering) the viewer's peripheral-vision region and is used or adapted to generate the peripheral-vision image portion (204).

As illustrated in FIG. 2A, the focal-vision image portion (202) and the peripheral-vision image portion (204) collectively represent all the image data in the foviated image (200) generated in reference to the viewer's view direction determined or predicted for a time point at which a display mapped image generated from the foviated image (200) is to be rendered. The focal-vision image portion (202) and the peripheral-vision image portion (204) in the foviated image (200) may be used to collectively cover the viewer's viewport (206) at the time point. As used herein, a viewport may refer to a total display area (or a total image rendering surface) available from one or more image displays (or one or more target displays) of a viewer on which the display mapped image generated from the foviated image (200) is rendered. An HDR source image used to generate multiple image portions in the foviated image (200) in reference to the viewer's view direction determined or predicted for the time point may cover an image field 208 (e.g., immersive, panorama, 360-degree view, etc.) much larger than the viewer's viewport (206).

The foviated image (200) may be used to cover the entirety of the viewport plus a safety margin. If the foviated image (200) happens to be insufficient to cover the entirety of the viewport, then filler pixels may be used for some (e.g., tiny, etc.) portions inside the viewport.

In some embodiments, multiple focal-vision image portions may be generated in the foviated image (200) generated in reference to the viewer's view direction determined or predicted for a time point at which the foviated image (200) is to be rendered. Additionally, optionally or alternatively, multiple peripheral-vision (e.g., near-peripheral, mid-peripheral, far-peripheral, etc.) image portions may be generated in the foviated image (200) generated in reference to the viewer's view direction determined or estimated for a time point at which the foviated image (200) is to be rendered.

In some embodiments, one or more other image portions in addition to focal-vision and peripheral-vision image portions may be generated for a foviated image as described herein. The other image portions and the focal-vision and peripheral-vision image portions collectively represent all the image data in the foviated image generated in reference to the viewer's view direction determined or predicted for a time point at which a display mapped image generated from the foviated image (200) is to be rendered.

Figure 2B:
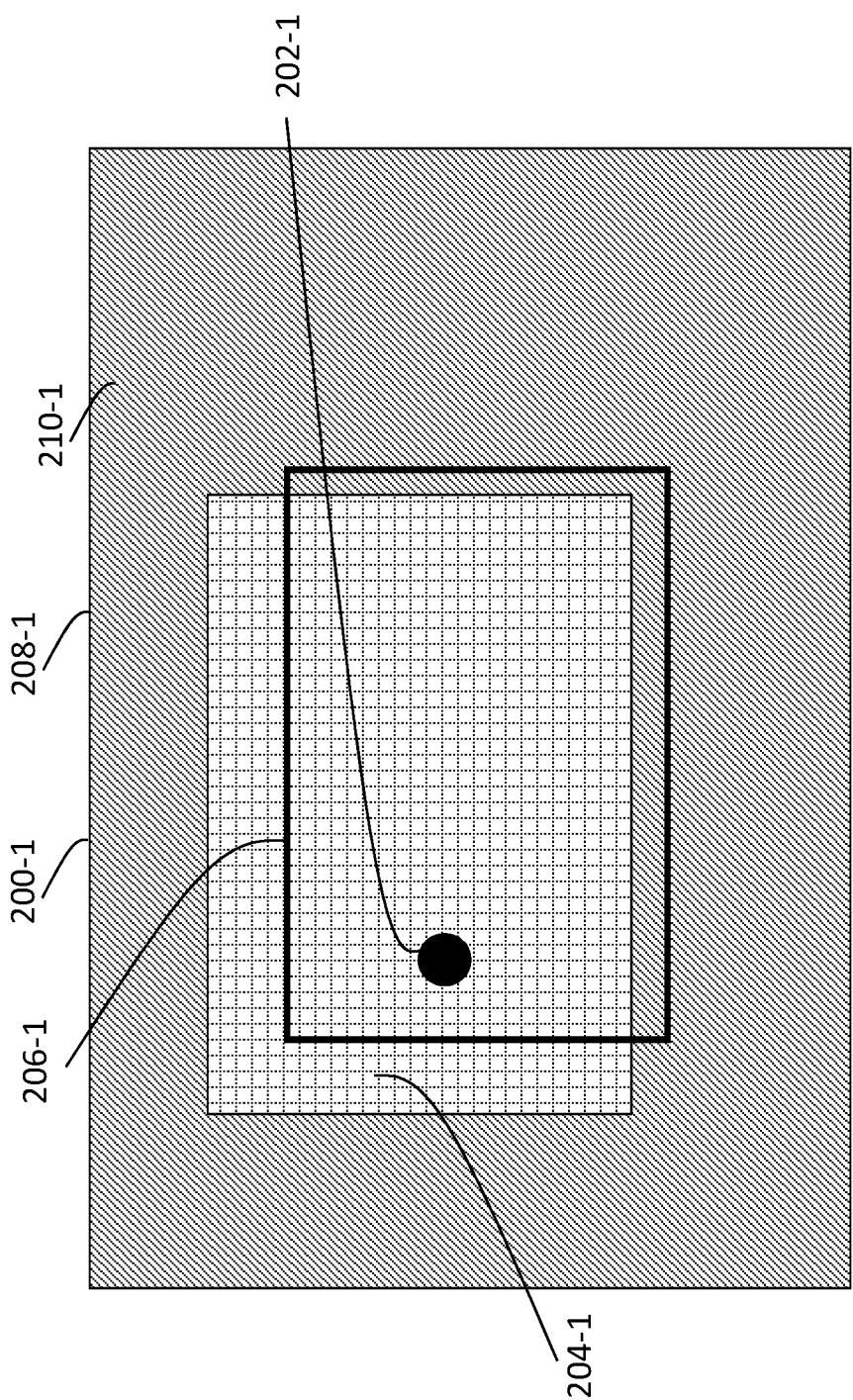

FIG. 2B illustrates an example foviated image 200-1 that comprise a focal-vision image portion 202-1, a peripheral-vision image portion 204-1, another image portion 210-1, etc. In some embodiments, the other image portion (210-1), the focal-vision image portion (202-1) and the peripheral-vision image portion (206-1) may cover up to the entirety of an image field 208-1 of an HDR source image (not shown) used to generate multiple image portions in the foviated image (200-1) in reference to the viewer's view direction determined or predicted for the time point. As illustrated in FIG. 2B, a display mapped image displayed in a viewport of the viewer's target display(s) may be composed of display mapped image data derived from the entirety of the focal-vision image portion (202-1), a portion of the peripheral-vision image portion (206-1) and a portion of the other image portion (210-1).

The HDR source image may be partitioned into three HDR source image portions that respectively correspond to the focal-vision image portion (202-1), the peripheral-vision image portion (204-1) and the other image portion (210-1) as shown in FIG. 2B. The first of the three HDR source image portions corresponds to (is capable of covering) the viewer's focal-vision region and is used or adapted to generate the focal-vision image portion (202-1). The second of the three HDR source image portions covers the viewer's peripheral-vision region and is used or adapted to generate the peripheral-vision image portion (204-1). The third of the three HDR source image portions covers image field portions outside the viewer's peripheral-vision region (or outside the viewport (206-1)) and is used or adapted to generate the other image portion (210-1).

In some embodiments, image data in the focal-vision image portion (202-1) of the foviated image (200-1) may comprise finest image details and have a relatively uncompressed dynamic range with no or little clippings or no or little quantization errors, a relatively wide color gamut with no or little color distortions or no or little quantization errors, a relatively high spatial resolution with no or little sampling errors, etc. The image data in the focal-vision image portion (202-1) may be generated from the corresponding image portion in the HDR source image with no, little or minimal downsampling in colors and/or spatial resolutions, with no, little or minimal dynamic range compression, etc.

In some embodiments, image data in the peripheral-vision image portion (204-1) of the foviated image (200-1) may comprise less image details and possibly have a compressed dynamic range with some clippings or relatively large quantization errors, a relatively narrow color gamut with some color distortions or relatively large quantization errors, a relatively low spatial resolution with relatively large sampling errors, etc. The image data in the peripheral-vision image portion (204-1) may be generated from the corresponding image portion in the HDR source image with downsampling in colors and/or spatial resolutions, with dynamic range compression, etc.

In some embodiments, image data in the other image portion (210-1) of the foviated image (200-1) may comprise even less image details and possibly have a more compressed dynamic range with more clippings or larger quantization errors, a narrower color gamut with color distortions or larger quantization errors, a lower spatial resolution with large sampling errors, etc. The image data in the other image portion (210-1) may be generated from the corresponding image portion in the HDR source image with more downsampling in colors and/or spatial resolutions, with more dynamic range compression, etc.

Foviated video content as described herein comprises at least some image data (e.g., in foveal-vision image portions, in peripheral-vision image portions, etc.) of a high dynamic range and a wide color gamut that may be beyond display capabilities of the viewer's target display. DM operations (or display mapping operations) can be spatially differentially applied to converting the foviated video content to display mapped video content for rendering to the viewer. The display mapped video content may be of a lower dynamic range, a narrower color gamut, etc. within the display capabilities of the viewer's target display to spatially varying degrees across each display mapped images in the display mapped video content.

Image metadata comprising DM metadata that indicates how dynamic range and color gamut should be mapped from a reference target display to the viewer's (actual) target display may be generated by a video streaming server for the foviated video content. Under techniques as described herein, DM operations are not necessarily spatially uniformly performed across a foviated image or across the viewer's viewport of a display mapped image generated from the foviated image. Rather, spatially differentiated DM operations may be performed with respect to different image portions located in different spatial portions of the foviated image, or located in different spatial portions of the viewport of the display mapped image generated from the foviated image.

The viewer's view direction as monitored under techniques as described herein is used to define or delineate a focal-vision image portion and other image portions such as a peripheral-vision image portion, etc., in the foviated image. A focal-vision DM metadata portion may be specifically or separately generated for the focal-vision image portion in the foviated image. Other DM metadata portions such as a peripheral-vision DM metadata portion, etc., may be specifically or separately generated for other image portions such as the peripheral-vision image portion, etc., in the foviated image.

Based on these different DM metadata portions, different DM operations with spatially differentiated impacts on dynamic range compression, downsampling in colors and/or spatial resolutions, etc., within the same foviated image.

An image metadata set delivered along with a foviated image to a recipient device may include various DM metadata portions generated for the foviated image. More specifically, the image metadata set delivered with the foviated image can comprise a focal-vision DM metadata portion for a focal-vision image portion covering a small angular degree range (e.g., 2-4 degrees, 3-5 degrees, 4-6 degrees, etc.) of a foveal-vision in the viewer's vision field. This focal-vision DM metadata portion can be used by the recipient device to remap the focal-vision image portion in the foviated image into a corresponding image portion in a display mapped image generated from the foviated image in a manner that preserves, in the focal-vision image portion of the display mapped image, finest image details in dynamic range, color gamut, spatial resolution, etc., available from a corresponding HDR source image as compared with non-focal-vision image portions of the display mapped image. Thus, DM metadata as described herein include not only those applicable to viewports and target displays, but also those applicable to real-time focal-vision regions (e.g., 2-4 degrees, 3-5 degrees, 4-6 degrees, etc.) of the viewer's vision fields at various time points.

By way of example but not limitation, an image metadata set as described herein may include some or all of the following DM metadata portions for some or all spatial regions relating to the viewer's vision field, a viewport, an image rendering area of a target display, an image field of an immersive image, etc. For example, a focal-vision DM metadata portion may comprise maximum, minimum, and/or average luminance levels or luma values in a focal-vision region in the viewer's vision field. A peripheral-vision DM metadata portion may comprise maximum, minimum, and/or average luminance levels or luma values in a peripheral-vision region in the viewer's vision field. A viewport DM metadata portion may comprise maximum, minimum, and/or average luminance levels or luma values in a viewport, which may be applicable to spatial regions of the viewport outside those represented by more specific DM metadata portions such as the focal-vision DM metadata, the peripheral-vision DM metadata, etc. An immersive (e.g., 360-degree, omnidirectional, etc.) DM metadata portion may comprise maximum, minimum, and/or average luminance levels or luma values in an image field of the HDR source image, which may be applicable to spatial regions of the image field outside those represented by more specific DM metadata portions such as the focal-vision DM metadata, the peripheral-vision DM metadata, the viewport DM metadata, etc. These different DM metadata portions can be used to define or generate different remapping curves (e.g., transfer functions, etc.) for DM operations applied to different spatial regions in a foviated image.

A remapping curve (e.g., transfer function, etc.) generated based on the DM metadata portion for the foveal-vision region may comprise no or little clippings and/or no or little quantization errors. For example, as the remapping curve is applied to mapping the focal-vision image portion of the foviated image to the focal-vision image portion of the display mapped image, all grayscale levels represented in the foviated image—which may also in turn faithfully keep all the grayscale levels in a corresponding HDR source image used to derive the foviated image—may be reproduced accurately in a corresponding display mapped image generated from the foviated image.

On the other hand, a remapping curve (e.g., transfer function, etc.) generated based on the DM metadata portion for a non-foveal-vision region may comprise clippings and/or quantization errors. For example, as the remapping curve is applied to mapping the peripheral-vision image portion of the foviated image to the peripheral-vision image portion of the display mapped image, some grayscale levels represented in the foviated image—which may also in turn do not represent all the grayscale levels in a corresponding HDR source image used to derive the foviated image—may not be reproduced or may be represented with quantization errors in the display mapped image.

5. Light Adaption Levels

In the real world, it would be very painful for a viewer to stare at the sun and then look at a dark area slightly away. It will take time (e.g., probably a long time, 5 seconds, 20 seconds, etc.) for the viewer to adapt from a very intense light level to a low light level. Before the viewer is adapted to the low light level, image details in dark image regions of a rendered image are not perceived to the full extent of what the rendered image may represent. Thus, it is a waste of computing resources and/or bandwidths for the rendered image to include image details when the viewer is not adapted to the low light level to perceive these image details to the full extent.

On the other hand, if the sun has not been in the viewer's foveal-vision, it would not be as painful or as long for the viewer to adapt to the low light level and to perceive image details to the full extent even though the sun were still present (away from the view's foveal-vision) in the vision field of the viewer or in an image field of an HDR source image used to directly or indirectly derive a rendered image (e.g., a display mapped image, etc.).

Thus, the viewer's perceptual capabilities to image details at various time points are affected by what light level the viewer is adapted to at these various time points. In particular, what light level the viewer is adapted to at a specific time point is (e.g., predominantly, largely, with a significantly high correlation, etc.) determined based on where, when and how long the viewer has specifically looked before the specific time point, and is not so much dependent on whether the rendered image may comprise other image details of very different light levels to the light level the viewer is adapted to, so long as these other image details are not in or near the viewer's foveal-vision.

Techniques as described herein can be implemented to predict the viewer's light adaptation level (or a light level to which the viewer is adapted) and emulate the natural vision process in the process of rendering display mapped video content display mapped from foviated video content. Image metadata such as DM metadata can be used to specify or influence how remapping curves used in DM operations (or other image processing operations) should vary, transition or adapt over time based on how fast the viewer is adapted to various light adaptation levels at various time points.

A light adaptation curve may be used by a video streaming server, a video streaming client, etc., to predict or estimate how the eye (one of the viewer) is to adapt over time. In some embodiments, the light adaptation curve may be dependent on a number of light adaptation factors or input variables including but not limited to one or more of: a light level of a source zone, a light level of a target zone, a length of time during which the viewer's focal vision is within the source zone, a length of time during which the viewer's focal vision is within the target zone, etc.

The light adaptation curve as described herein may, but is not necessarily limited to only, be based on the human visual model. The light adaptation curve may comprise input factors that take into account differences in target displays. For example, the light adaptation curve may predict different light adaptation levels differently for different types of target displays with different display capabilities.

The light adaptation curve as described herein may predict light adaptation levels differently for scenes of different image contexts. Example image contexts in scenes may include, without limitation, continue pursuit (e.g., the viewer's eye makes rapid or ballistic movements or saccades, etc.), smooth pursuit scenes (e.g., the viewer's eye makes smooth pursuit movements, etc.), scenes of relatively large depths (e.g., the viewer's eye makes vergence movements, etc.), or other scenes (e.g., the viewer's eye makes small vestibulo-ocular movements to stabilize or compensate for an object's movement in a depicted scene, etc.).

For example, in a continue pursuit scene, the light adaptation curve may provide more weights to light levels of image details (or pixels) directly depicting a continue pursuit and less weight to light levels of image details (or pixels) not directly depicting a continue pursuit.

In contrast, the light adaptation curve may predict light adaptation levels in smooth scenes (e.g., slow changing scenes, etc.) differently from other scenes. In such scene, the light adaptation curve may assign (e.g., comparable, at the same order of magnitude, etc.) weights to light levels of image details in a relatively large zone (e.g., including some of the peripheral-vision image details, etc.) in the scene.

Artist intent (e.g., director input, colorist input, etc.) may be incorporated to adjust some or all of operational parameters (e.g., curve parameters such as lift, gain, offset, etc.) in the model used to construct a light adaptation curve for determining, estimating or predicting the viewer's light adaptation level.

The light adaptation curve used to predict the viewer's light adaptation level may also be in part based on user input. For example, the viewer may interact with a recipient device and/or a target display to select a specific light adaptation setting from among a plurality of selectable light adaptation settings. The specific light adaptation setting may be used to influence on how a light adaptation curve predicts the viewer's light adaptation levels, to determine values to some or all of input parameters used in the light adaptation curve, etc.

Under techniques as described herein, given a target zone which the viewer was viewing, a source zone which the viewer is predicted to be viewing may be determined based on a cannon ball model or a model specifically developed (e.g., through experimentation, through simulation, through validation studies, etc.) for human eye movements. For example, the viewer's eye movements (e.g., saccades, smooth pursuit movements, vergence movements, vestibulo-ocular movements, etc.) may be monitored based on the view tracking data. A velocity, an acceleration, etc., in view direction change may be determined at the target zone based on the view tracking data that tracks the viewer's eye movements. Along with the initial location of the target zone, the location of the source zone may be determined, estimated or predicted based at least in part on the velocity, the acceleration, etc., as measured at the target zone.

Based on the viewer's light adaptation level predicted or estimated at a given time, a distribution of spatially-varying just noticeable difference (JND) may be determined in various regions of the viewer's vision field. Dynamic ranges and spatial resolutions may be adjusted based on the distribution of spatially-varying JND in the viewer's vision field. In an image portion (e.g., peripheral vision, etc.) where the viewer's vision capabilities (e.g., based on the JNDs, etc.) are predicted or estimated to be not capable of distinguishing fine image details or fine grayscale level differences, image data (e.g., a relatively low bit depth image data such as low as 2-bit video data may be provided, etc.) in the image portion can be downsampled, compressed, etc., without causing visual artifacts in the viewer's vision perception. On the other hand, in an image portion (e.g., foveal vision, etc.) where the viewer's vision capabilities (e.g., based on the JNDs, etc.) are predicted or estimated to be capable of distinguishing fine image details or fine grayscale level differences, image data (e.g., a relatively high bit depth image data such as low as 12-bit video data may be provided, etc.) in the image portion can be mapped 1-1 from HDR source image(s) to maintain or preserve fine image details.

Figure 2C:
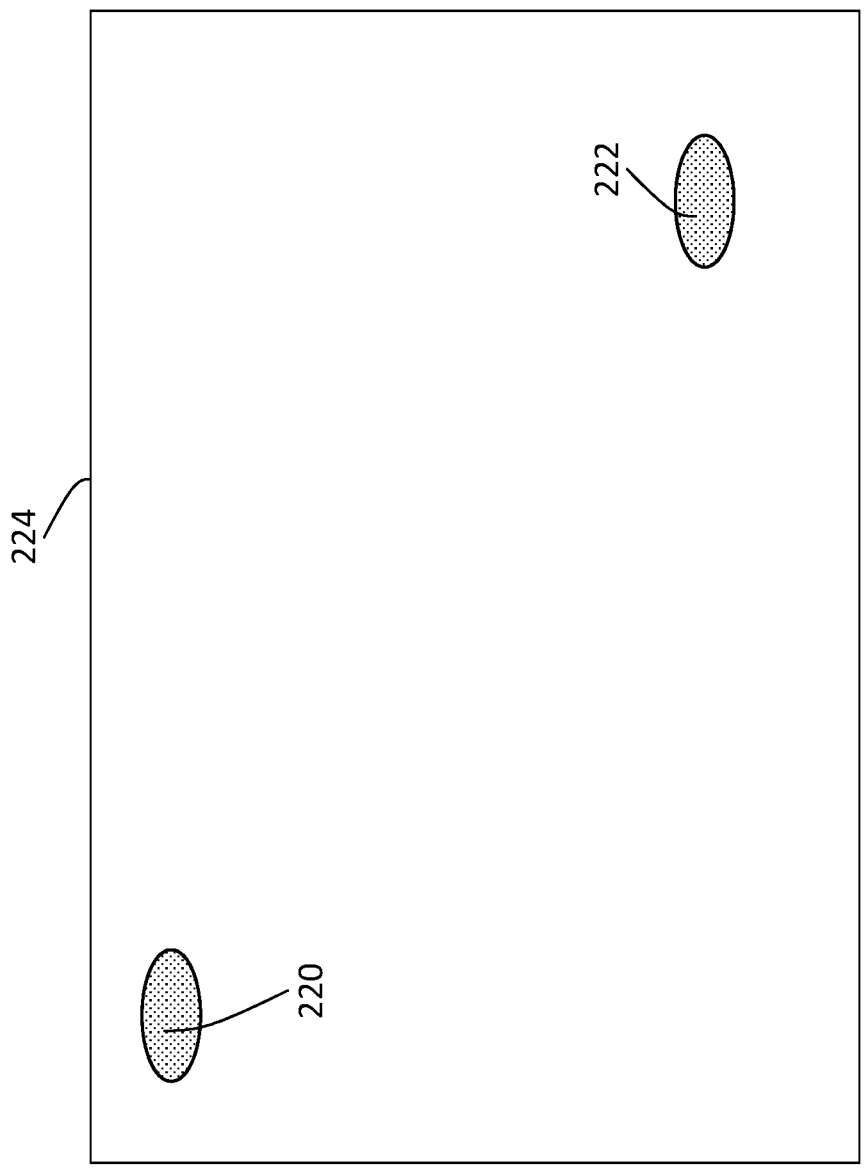
FIG. 2C illustrates example source and target zones.

FIG. 2C illustrates an example source zone 220 and an example target zone 222 in a rendered scene 224 viewed by a viewer. The source zone (220) represents a spatial location or a zone (of a rendered scene) where the viewer's focal vision was previously located in the rendered scene (224). The target zone (222) represents a spatial location or a zone (of a rendered scene) where the viewer's focal vision is (e.g., determined to be, predicted to be, estimated to be, etc.) located for a time point at which a display mapped image is to rendered, where the display mapped image is to be remapped from a foviated image based at least in part on the viewer's light adaptation level predicated for the time point based on the light adaptation curve. Example shapes of a zone may include but are not limited to A light level of a zone such as the target zone (222), the source zone (220), etc., may be determined based on a weighted aggregated light level determined/computed from luminance values of pixels within and around the zone. To compute the light level of the zone, luminance values of pixels in innermost portions of the zone may be given (e.g., significantly, etc.) higher weight than luminance values of pixels outside the innermost portions of the zone or outside the zone. Specific ways, specific factors, specific parameters, etc., of computing a light level of a zone may be based on human vision modeling, light adaptation models for the human visual system (HVS), empirical human vision studies, experiments, validations, etc.

At the time when the viewer's view direction is inside a zone, the viewer may or may not have been adapted to the zone. In some embodiments, the light adaptation curve may be used to determine a fade-in-fade-out time for the viewer to adjust to the light level in the target zone (222). The fade-in-fade-out time may be used as an adaptation time for remapping foviated video content to display mapped video content.

For example, in response to determining that an adaptation time is needed for the viewer to adapt to the light level of the target zone (222), a video streaming server may signal the adaptation time in image metadata. A recipient device may delay remapping full image details in the target zone (222) (or possibly elsewhere) until the adaptation time is past. During the adaptation time, light levels or light level ranges not well perceived by the viewer's eye may be clipped or represented with coarse grayscale levels or colors coded with large quantization step sizes. Once the adaptation time is past and the viewer is predicted to be adapted to the light level of the target zone (222), full image details may be reproduced/rendered for the target zone (222) in the display mapped content at or around the viewer's new light adaptation level (which equals or closely approximate the light level of the target zone (222)).

Thus, under techniques as described herein, given the same HDR source image in a sequence of HDR source images, depending on what the viewer's predicted light adaptation level (which depends on a history of the viewer's view directions and previous rendered image content) is, different foviated images can be generated from the HDR source image, and different display mapped images may be reproduced/rendered.

For example, when the viewer's eye has been looking at the source zone (220) in the top left corner of a rendered scene through a viewport of the viewer's target display(s), and then looks down at the target zone (222) in the rendered scene through the same viewport, display mapping operations (or DM operations) as described herein take into account an adaptation time of the viewer's eye based on when and how bright the image portion at the source zone (220) was and how long the viewer's eye adapts to light levels in a series of target zones until the light level in the target zone (222).

Thus, if the viewer's eye was looking at or near the sun in an image at the source zone (220), then cranking up or preserving the top of the luminance range to its maximum or peak luminance level with no or little loss of image details at bright luminance levels or bright luminance ranges and crushing or clipping dark luminance levels or shadows in the luminance range in the target zone (222) (or elsewhere) is acceptable before the viewer's eye is adapted to the light level in the target zone (222). In addition, as the viewer's eye moves to the target zone (222) in the shadow and as the viewer's eye become more and more adapted to the light level in the target zone (222), a darkening of the entire image first without showing image details around the light level in the target zone (222) and then (temporally) slowly bringing out image details in the shadows over time is acceptable, for example, by way of specifying an adaptation time in the image metadata that are sent (e.g., contemporaneously, etc.) with foviated images to the viewer's video decoding device operating in conjunction with the viewer's target display(s).

6. Spatially Differentiated Display Mapping

Figure 2D:
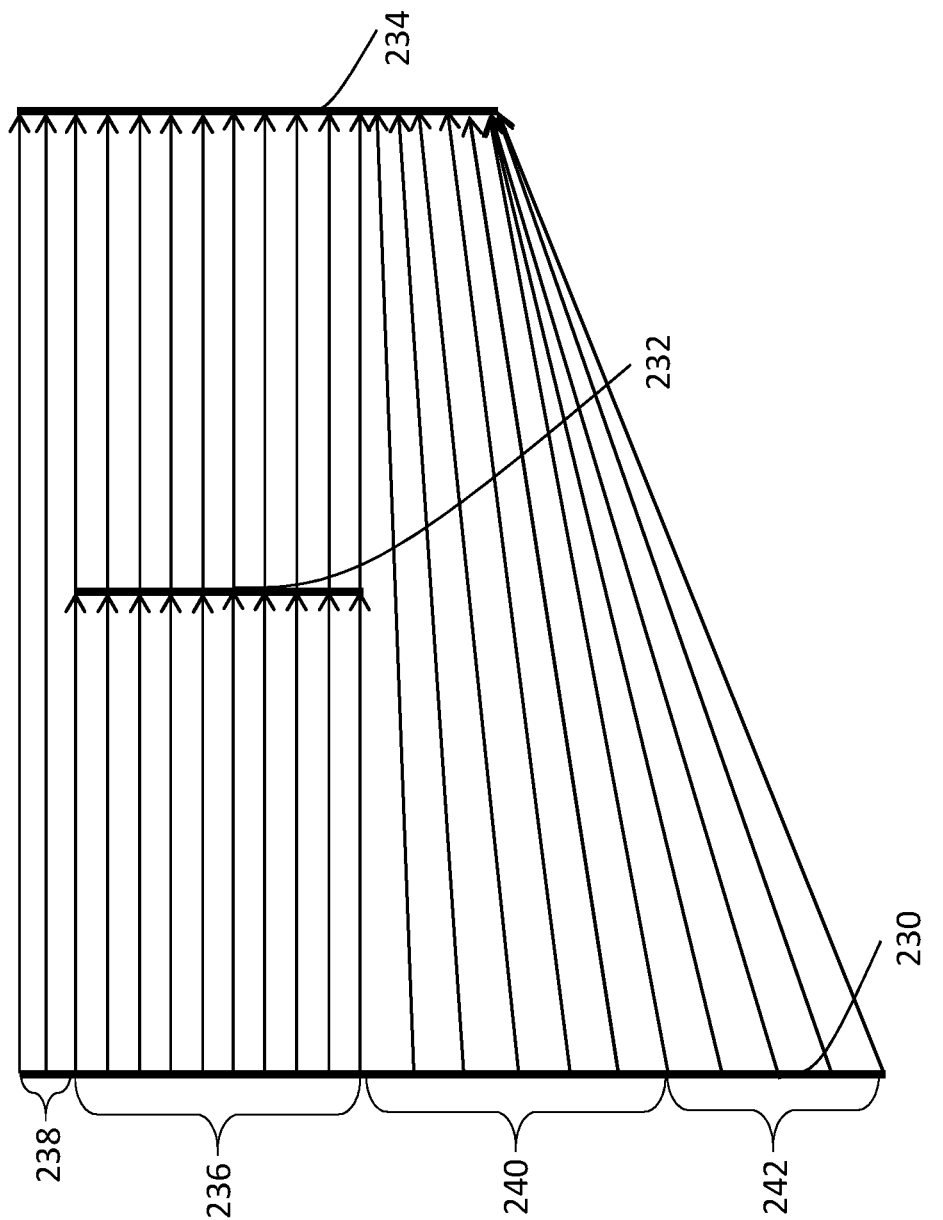
FIG. 2D, FIG. 2E and FIG. 2G illustrate example display mappings.

FIG. 2D illustrates example display mappings from an HDR source dynamic range 230 (e.g., uniformly across the entirety, etc.) of an HDR source image to a focal-vision dynamic range 232 of a focal-vision image portion of a foviated image generated from the HDR source image and a peripheral-vision dynamic range 234 of a peripheral-vision image portion of the foviated image in operational scenarios in which the viewer's eye is adapted to a relatively high light level.

As shown, a first subrange 236 of the HDR source dynamic range (230) may represent the entire dynamic range of a first image portion (of the HDR source image) used to derive/generate the focal-vision image portion of the foviated image. Under techniques as described herein, no or minimal dynamic range compression may be performed on the first image portion of the HDR source image, which first image portion is used to derive/generate the focal-vision image portion of the foviated image (e.g., in response to determining that the viewer's light adaptation level is comparable with a weighted aggregated light level in a zone around the focal-vision image portion, etc.). All grayscale levels and/or colors and/or spatial resolutions of the first image portion of the HDR source image may be 1-1 or relatively faithfully reproduced in the focal-vision image portion with the focal-vision dynamic range (232) and/or focal-vision color gamut and/or focal-vision spatial resolutions.

On the other hand, under techniques as described herein, (e.g., relatively large, etc.) dynamic range compression may be performed on other image portions of the HDR source image, which other image portions are used to derive/generate non-focal-vision image portion(s) of the foviated image. Some grayscale levels and/or colors and/or spatial resolutions of the other image portions of the HDR source image may be compressed, downsampled or represented with large quantization errors in the non-focal-vision image portions with non-focal-vision dynamic range(s) and/or non-focal-vision color gamut and/or non-focal-vision spatial resolutions. Some grayscale levels and/or colors and/or spatial resolutions of the other image portions of the HDR source image may be clipped or represented with even large errors in the non-focal-vision image portions with the non-focal-vision dynamic range(s) and/or the non-focal-vision color gamut and/or the non-focal-vision spatial resolutions.

For example, a second subrange 240 of the HDR source dynamic range (230) may represent nearby grayscale levels lower than the first subrange (236) of the first image portion (of the HDR source image) used to derive/generate at least a part of the peripheral-vision image portion of the foviated image. Grayscale or luminance levels represented in the second subrange (240) of the HDR source dynamic range (230) may be compressed in the peripheral-vision dynamic range (234). A third subrange 242 of the HDR source dynamic range (230) may represent grayscale levels used to derive/generate at least a part of the peripheral-vision image portion of the foviated image, and are even lower than the second subrange (240) of the first image portion (of the HDR source image) and further away from the viewer's light adaptation level. Grayscale or luminance levels represented in the third subrange (242) of the HDR source dynamic range (230) may be clipped in the peripheral-vision dynamic range (234). In contrast, grayscale or luminance levels represented in a fourth subrange (238) of the HDR source dynamic range (230) may be largely reproduced in the peripheral-vision dynamic range (234), if these grayscale or luminance levels are close to the viewer's light adaptation level, even if these grayscale or luminance levels are not a part of dynamic range used to encode the focal-vision image portion of the foviated image.

Figure 2E:
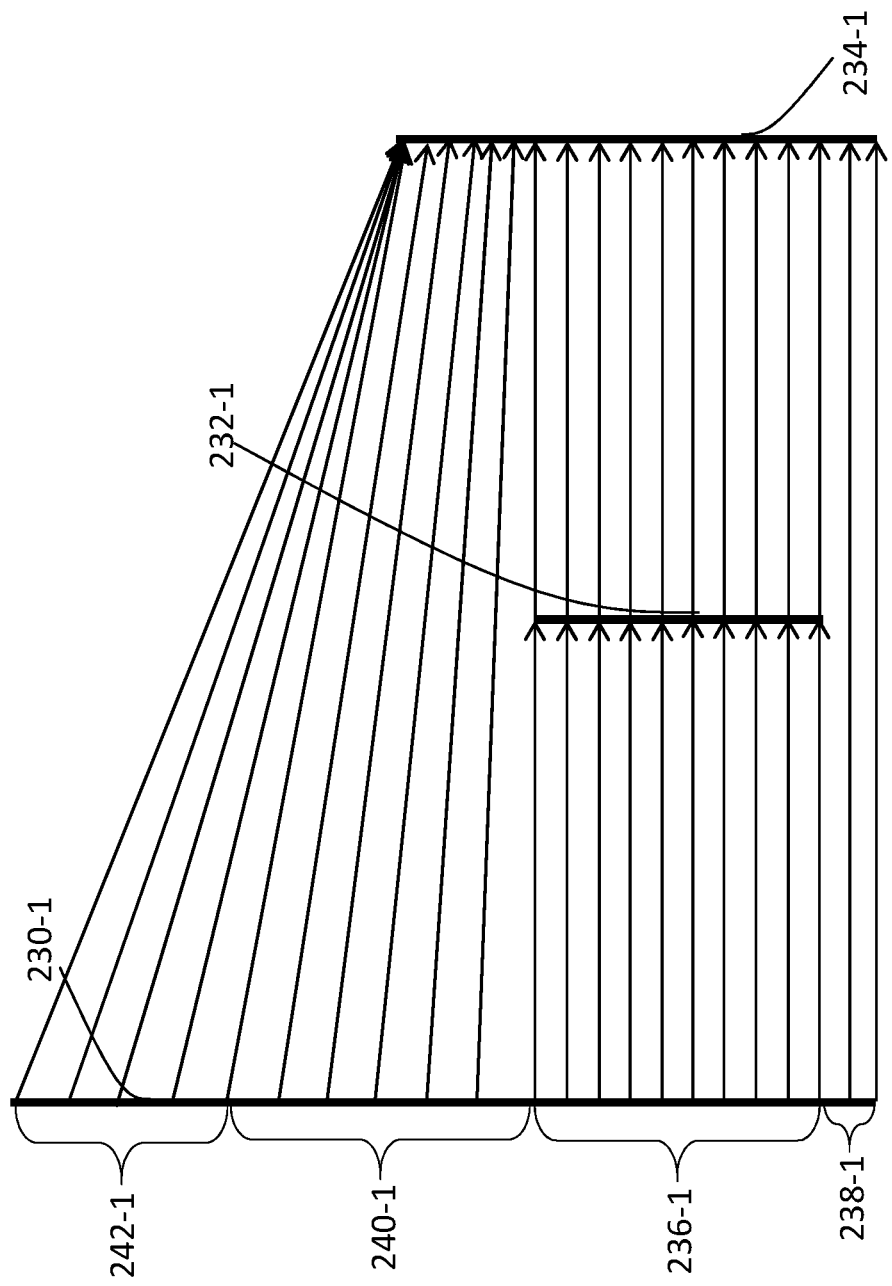

FIG. 2E illustrates example display mappings from an HDR source dynamic range 230-1 (e.g., uniformly across the entirety, etc.) of an HDR source image to a focal-vision dynamic range 232-1 of a focal-vision image portion of a foviated image generated from the HDR source image and a peripheral-vision dynamic range 234-1 of a peripheral-vision image portion of the foviated image in operational scenarios in which the viewer's eye is adapted to a relatively low light level.

As shown, a first subrange 236-1 of the HDR source dynamic range (230-1) may represent the entire dynamic range of a first image portion (of the HDR source image) used to derive/generate the focal-vision image portion of the foviated image. All grayscale levels and/or colors and/or spatial resolutions of the first image portion of the HDR source image may be 1-1 or relatively faithfully reproduced in the focal-vision image portion with the focal-vision dynamic range (232-1) and/or focal-vision color gamut and/or focal-vision spatial resolutions.

On the other hand, a second subrange 240-1 of the HDR source dynamic range (230-1) may represent nearby grayscale levels higher than the first subrange (236) of the first image portion (of the HDR source image) used to derive/generate at least a part of the peripheral-vision image portion of the foviated image. Grayscale or luminance levels represented in the second subrange (240-1) of the HDR source dynamic range (230-1) may be compressed in the peripheral-vision dynamic range (234-1). A third subrange 242-1 of the HDR source dynamic range (230-1) may represent grayscale levels used to derive/generate at least a part of the peripheral-vision image portion of the foviated image, and are even higher than the second subrange (240-1) of the first image portion (of the HDR source image) and further away from the viewer's light adaptation level. Grayscale or luminance levels represented in the third subrange (242-1) of the HDR source dynamic range (230-1) may be clipped in the peripheral-vision dynamic range (234-1). In contrast, grayscale or luminance levels represented in a fourth subrange (238-1) of the HDR source dynamic range (230-1) may be largely reproduced in the peripheral-vision dynamic range (234-1), if these grayscale or luminance levels are close to the viewer's light adaptation level, even if these grayscale or luminance levels are not a part of dynamic range used to encode the focal-vision image portion of the foviated image.

Display mapped video content as described herein may be rendered on one or more target displays of a viewer that support global dimming, local dimming or low count dimming. As used herein, a target display that supports global dimming refers to a display device that is capable of adjusting a (e.g., global, etc.) luminance level of light across the entire display area or the entire image rendering surface before the light is modulated into an image based on image data. A target display that supports local dimming refers to a display device that is capable of adjusting individual local-area luminance levels of light for a relatively large number (e.g., tens, hundreds, thousands or more, etc.) of areas within a display area or image rendering surface before the light is modulated into an image based on image data; the individual local-area luminance levels for the individual areas may be controlled based at least in part on a downsampled version of the image. A target display that supports low count dimming refers to a display device that is capable of adjusting individual local-area luminance levels of light for a relatively small number (e.g., two, four, six, eight, etc.) of areas within a display area or image rendering surface before the light is modulated into an image based on image data.

In an example, a remapped dynamic range in an image portion such as a foveal-vision image portion may be used to influence how backlight in a target display with overdrive and/or underdrive capabilities is used in image rendering operations. If the foveal-vision image portion is of a relatively high dynamic range or peak luminance values, the target display may overdrive backlight sub-units that provide backlight to the foveal-vision image portion. Additionally, optionally or alternatively, the target display may underdrive backlight sub-units that provide backlight to non-foveal-vision image portion(s) to prevent overheating or overconsumption of energy.

In another example, a global-dimming target display may be capable of supporting a number of (e.g., 1000, etc.) grayscale levels at a given time. These grayscale levels can be used to maximally support rendering of image details or grayscale levels in the viewer's foveal vision. When the viewer is viewing a bright image detail, the global dimming target display can set most if not all of the grayscale levels to relatively high luminance values (e.g., 3000-4000 nits, etc.). On the other hand, when the viewer is viewing a dark image detail, the global dimming target display can set most if not all of the grayscale levels to relatively low luminance values (e.g., 0.1 nit-100 nits, etc.). Similarly, other luminance subranges may be dynamically set by the global-dimming target display depending on the dynamic range to be represented in the viewer's foveal vision at any given time. As a result, even though the global-dimming target display may be limited to 1000 grayscale levels, the global-dimming target display can render in the viewer's foveal vision with a much larger dynamic range and much more numerous grayscale levels, thereby creating an impression that the global-dimming target display is of local dimming capabilities, is capable of supporting a very high dynamic range from a very low luminance value to a very high luminance value, is capable of supporting a very large contrast (e.g., from the lowest luminance value of 0.1 nit to the peak luminance value of 4000 nits, etc.), is capable of rendering images with high fidelity, etc.

Additionally, optionally or alternatively, a low-count dimming target display may be used to render display mapped images generated from foviated images as described herein. Similarly to the global-dimming target display, the low-count dimming target display can also adaptively set a dynamic range with grayscale levels in any zone of a low count total number of zones in the target display based on dynamic ranges of foveal-vision image portions in display mapped images. As a result, even though the low-count dimming target display may have a relatively limited number of zones for dimming operations and may be limited to a number of grayscale levels in each of the zones, the low-count dimming target display can render in the viewer's foveal vision with a much larger dynamic range and much more numerous grayscale levels, thereby creating an impression that the low-count dimming target display is of local dimming capabilities, is capable of supporting a very high dynamic range from a very low luminance value to a very high luminance value, is capable of supporting a very large contrast (e.g., from the lowest luminance value of 0.1 nit to the peak luminance value of 4000 nits, etc.), is capable of rendering images with high fidelity, etc.

Figure 2F:
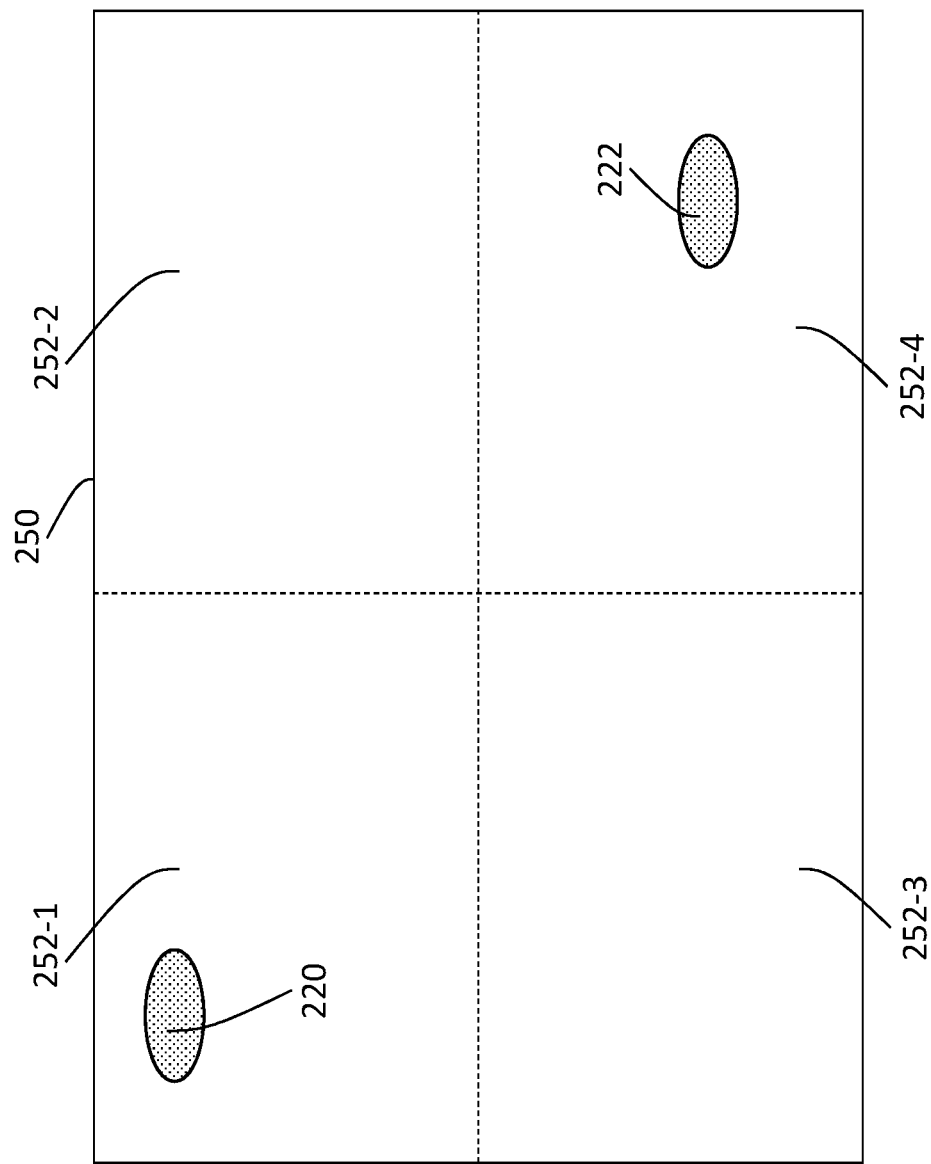
FIG. 2F illustrates an example low-count dimming target display.

FIG. 2F illustrates an example low-count dimming target display 250 that comprises four individual low-count dimming areas 252-1 through 252-4. In each of the dimming areas (252-1 to 252-4), an individual luminance level can be adjusted. For example, at a first time, the viewer's view direction or foveal-vision may be located in a source zone (e.g., 220, etc.) corresponding to a low-count dimming area 252-1, the luminance level of the low-count dimming area (252-1) may be controlled based on a dynamic subrange of luminance values of display mapped pixels that are within the low-count dimming area (252-1). In particular, the luminance level of the low-count dimming area (252-1) may be set to at least no less than the peak luminance in the viewer's foveal-vision, in the viewer's foveal-vision, in the source zone (220), etc. As a result, luminance values of display mapped pixels that are within the viewer's foveal-vision, in the viewer's foveal-vision, in the source zone (220), etc., can be reproduced to the maximum possible extent or fidelity.

At a second time, the viewer's view direction or foveal-vision may be located in a target zone (e.g., 222, etc.) corresponding to a low-count dimming area 252-4, the luminance level of the low-count dimming area (252-4) may be controlled based on a dynamic subrange of luminance values of display mapped pixels that are within the low-count dimming area (252-4). In particular, the luminance level of the low-count dimming area (252-4) may be set to at least no less than the peak luminance in the viewer's foveal-vision, in the viewer's foveal-vision, in the target zone (222), etc. As a result, luminance values of display mapped pixels that are within the viewer's foveal-vision, in the viewer's foveal-vision, in the target zone (222), etc., can be reproduced to the maximum possible extent or fidelity.

Figure 2G:
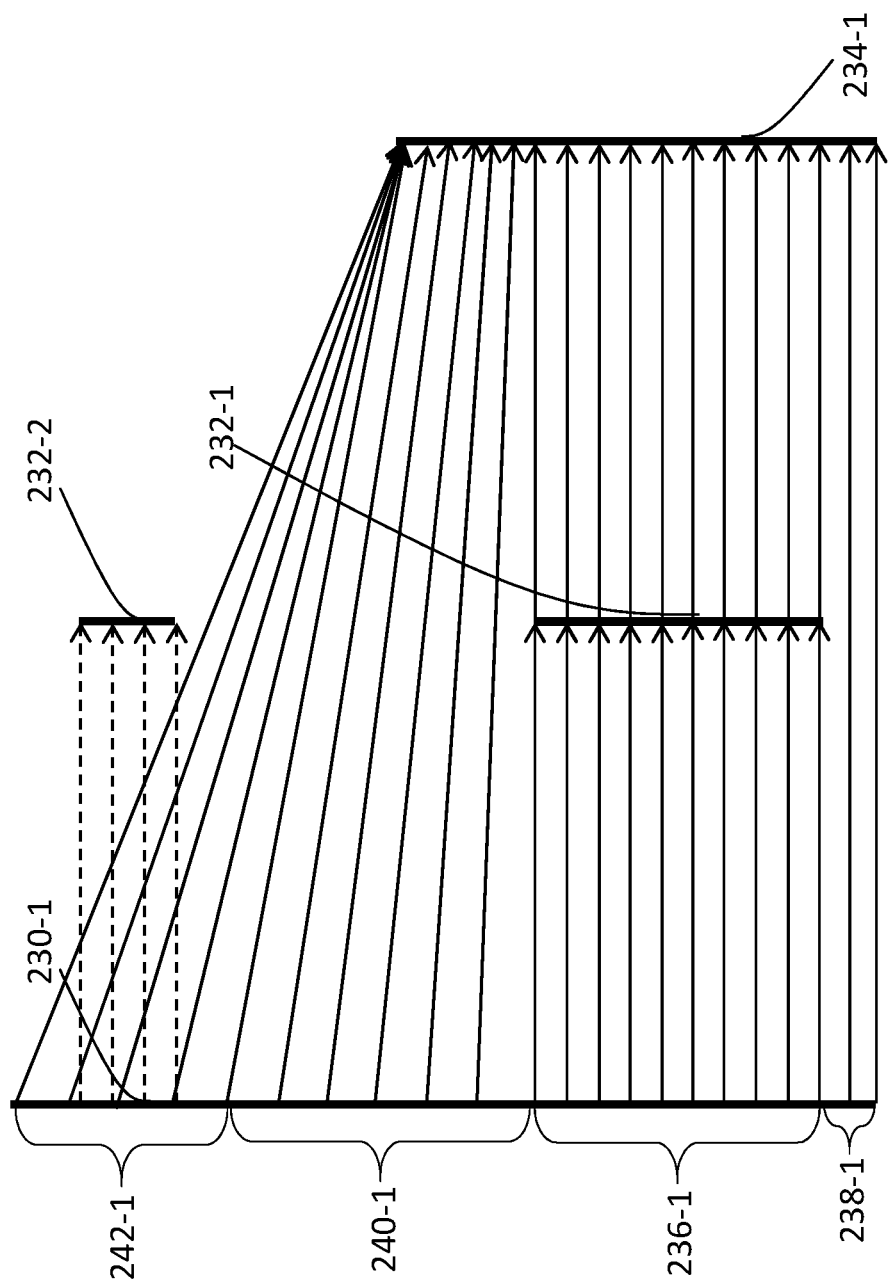

FIG. 2G illustrates example display mappings from an HDR source dynamic range 230-1 (e.g., uniformly across the entirety, etc.) of an HDR source image to a focal-vision dynamic range of a focal-vision image portion of a foviated image generated from the HDR source image and a peripheral-vision dynamic range 234-1 of a peripheral-vision image portion of the foviated image in operational scenarios in which the viewer's eye is adapted to a relatively low light level. The focal-vision dynamic range of the focal-vision image portion of the foviated image may comprise two dynamic subranges, one of which may correspond to the dynamic range 232-1 of FIG. 2E, and the other of which may be an additional dynamic range 232-2 (e.g., an image highlight, a light bulb, a strong reflection from a shining surface, etc.) higher than the dynamic range (232-1).

In some embodiments, a global dimming display may set its luminance level of the entire display to be no less than the maximum luminance value in the additional dynamic range 232-2 in order to perform no or minimal dynamic range compression for the focal-vision image portion.

In some embodiments, a local dimming display may set its local luminance levels in different areas of the display to be no less than the maximum luminance value of display mapped pixels in these different areas if these display mapped pixels are a part of the focal-vision image portion.

In some embodiments, a low count dimming display may set its luminance levels in different low-count areas of the display to be no less than the maximum luminance value of display mapped pixels in these different areas if these display mapped pixels are a part of the focal-vision image portion.

Additionally, optionally or alternatively, light direction methods, phased light modulation methods, etc., may be used to divert more light towards locations of display mapped pixels in case these display mapped pixels need elevated luminance levels. For example, if display mapped pixels with luminance values in the additional dynamic range (232-2) are located in the focal-vision image portion, then one or more light direction methods, phased light modulation methods, etc., may be used to increase the light levels or luminance levels for these display mapped pixels. It is possible that, as more light is directed to these display mapped pixels with the elevated light levels or luminance levels, light levels or luminance levels of other display mapped pixels in other image portions may be decreased or sacrificed.

In some operational scenarios, instead of or in addition to view direction tracking, a priori user input (e.g., from a colorist, director, video professional, etc.) may be used to identify a focal-vision image portion in an HDR source image or a foviated image generated therefrom. A focal-vision foviated image portion and a corresponding DM metadata portion may be generated from the focal-vision image portion as identified based on the user input in the HDR source image. The DM metadata portion may be used by a recipient device to ensure that image details in terms of dynamic range, color gamut, spatial resolution, etc., in the focal-vision image portion as designated based on the user input are preserved in a foviated image and a display mapped image generated from the foviated image. Foveal-vision image portions identified based on user input may be used to direct the viewer's view directions, for example into a certain interesting area for a specific amount of time, where the certain interesting area is rendered with image details while other areas may be masked off or may contain fewer image details relative to the interesting area.

In some embodiments, display mapped video content as described herein in a video application such as AR, etc., may be created based at least in part on ambient light level in the video application. The ambient light level as monitored with the viewer's target display(s) may be used to adjust dynamic range(s), dynamic subrange(s), etc., in various image portions of the display mapped video content to which corresponding dynamic range(s), dynamic subrange(s), etc., in foviated video content are to be mapped or remapped. For example, the ambient light level may be used to adjust a dynamic range mapping based on a DM metadata portion and a default ambient light level to an adjusted dynamic range mapping based on the DM metadata portion and an actual ambient light level as monitored by the viewer's target display(s). The adjusted dynamic range mapping may be used to map or remap a dynamic range of an image portion in a foviated image to display mapped dynamic range of a corresponding image portion in the foviated image.

Techniques as described herein can be applied to a variety of video content. For example, in a video application that displays 2D video content on a display such as a TV, view directions of one or more viewers that are viewing the 2D video content may be monitored in real time, near real time, etc. These view directions may be used to (e.g., concurrently, etc.) identify one or more focal-vision image portions in which image details are to be preserved. A foviated image may be created to contain the one or more focal-vision image portions from one or more corresponding image portions in an HDR source image used to generate the foviated image.

For the purpose of illustration, it has been described that a viewer's view direction (e.g., to a source zone, to a target zone, to an intermediate zone, etc.) at a given time may be determined based on view direction data collected/tracked while the viewer is viewing foviated video content. Additionally, optionally or alternatively, a viewer's view direction at a given time may be predicted. For example, in some embodiments, one or more upstream devices may measure network latencies between the one or more upstream devices and a downstream recipient device. The one or more upstream devices may also determine the viewer's movements (e.g., in six degrees of freedom, in rotations, in translations, in a combination of rotations and translations, etc.). Based on the network latencies and the viewer's movements, the one or more upstream device may predict a view direction of the viewer at a subsequent time point.

In some embodiments, a downstream device may determine the viewer's movements (e.g., in six degrees of freedom, in rotations, in translations, in a combination of rotations and translations, etc.). Based on the viewer's movements, the downstream device may predict a view direction (e.g., to a source zone, to a target zone, to an intermediate zone, etc.) of the viewer at a subsequent time point.

7. Example Video Streaming Servers and Clients

Figure 3A:
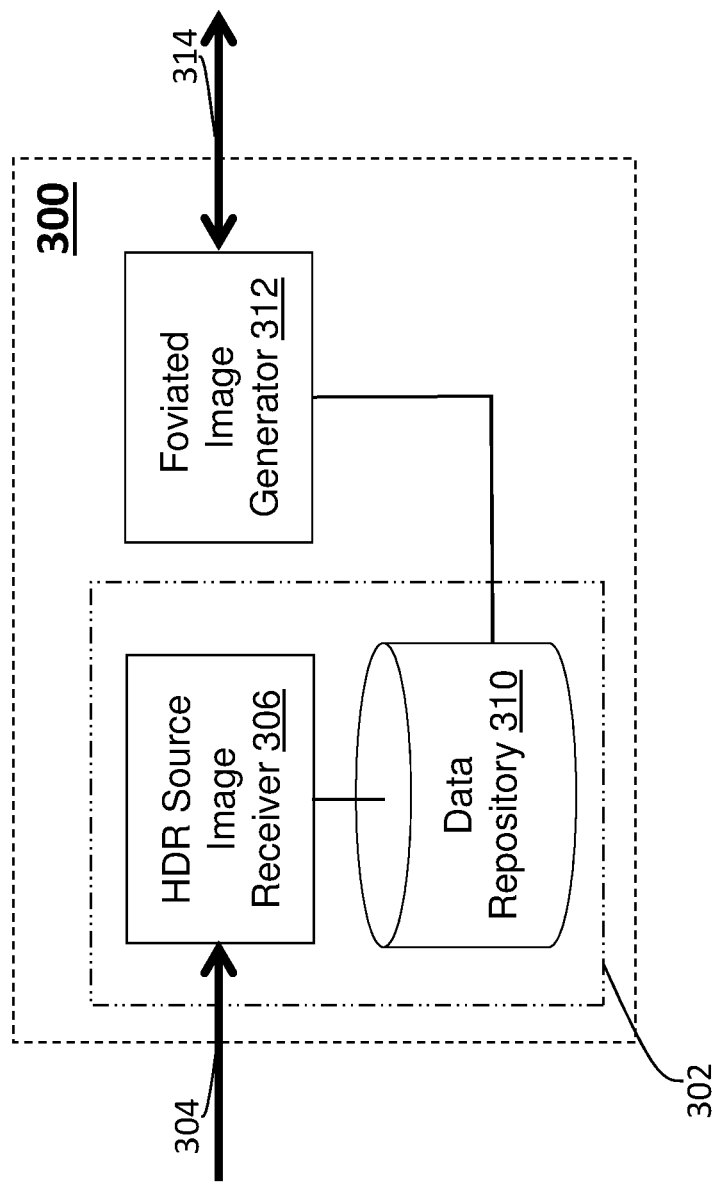
FIG. 3A through FIG. 3C illustrate example video streaming servers and clients.

FIG. 3A illustrates an example video streaming server 300 that comprises a foviated image processor 302, a foviated image generator 312, etc. In some embodiments, the foviated image processor (302) comprises an HDR source image receiver 306, a data repository 310, etc. Some or all of the components of the video streaming server (300) may be implemented by one or more devices, modules, units, etc., in software, hardware, a combination of software and hardware, etc.

In some embodiments, the HDR source image receiver (306) comprises software, hardware, a combination of software and hardware, etc., configured to receive an input HDR source image stream 304 from an HDR source image source such as a cloud-based HDR source image source, a camera system in connection with a VR application, an AR application, a remote presence application, a display application, etc.; decode the input HDR source image stream (304) into one or more input HDR source images (e.g., a sequence of input HDR source images, etc.); etc.

In some embodiments, the data repository (310) represents one or more databases, one or more data storage units/modules/devices, etc., configured to support operations such as storing, updating, retrieving, deleting, etc., with respect to some or all of the input HDR source images, etc.

In some embodiments, the foviated image generator (312) comprises software, hardware, a combination of software and hardware, etc., configured to receive, via a bidirectional data flow 314, a viewer's view direction data; establish/determine the viewer's view directions (e.g., for each of the two eyes, etc.) over time in relation to a spatial coordinate system in which foviated video content is to be rendered in the viewer's image rendering device (or display device); generate an overall video stream encoded with multiple image portions and multiple DM metadata portions of each of the HDR source images, etc. Different DM metadata portions may be separately and specifically generated in reference to the viewer's (e.g., determined, predicted, estimated, etc.) view direction at a time point for different image portions in an HDR source image to be rendered at the time point, and may be delivered in an image metadata set delivered along with the different image portions in the HDR source image to a downstream device via the bidirectional data flow 314 (e.g., directly or indirectly through intermediate devices, etc.). The downstream device may represent a video streaming client, a display device, a storage device, a video decoder operating with a target display, etc.

Additionally, optionally, or alternatively, some or all of image processing operations such as image rotation determination, image alignment analysis, scene cut detections, transformation between coordinate systems, temporal dampening, display management, content mapping, color mapping, field-of-view management, etc., may be performed by the video streaming server (300).

The video streaming server (300) may be used to support real time immersive video applications, near-real-time immersive video applications, real time non-immersive video applications, near-real-time non-immersive video applications, non-real-time immersive video applications, virtual reality, augmented reality, automobile entertainment, helmet mounted display applications, heads up display applications, games, 2D display applications, 3D display applications, multi-view display applications, etc. For example, some or all of view direction tracking data, multiple image portions and multiple DM metadata portions generated in reference to the viewer's view directions, etc., are generated or accessed by the video streaming server (300) in real time, in near real time, etc.

Figure 3B:
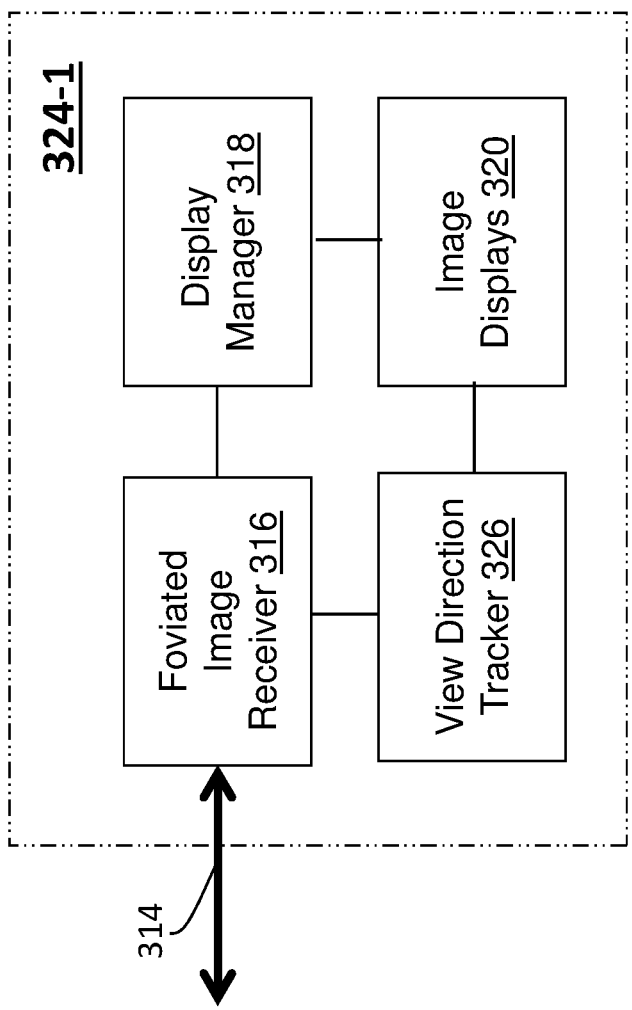

FIG. 3B illustrates an example image rendering system 324-1 that comprises a foviated image receiver 316, a view direction tracker 326, a display manager 318, one or more image displays (or one or more target displays) 320, etc.

Some or all of the components of the image rendering system (324-1) may be implemented by one or more devices, modules, units, etc., in software, hardware, a combination of software and hardware, etc.

In some embodiments, the foviated image receiver (316) comprises software, hardware, a combination of software and hardware, etc., configured to send, via a bidirectional data flow 314, the viewer's view direction tracking data, which can be used by a video streaming server to establish/determine the viewer's view directions over time in relation to a spatial coordinate system in which foviated video content is to be rendered in the viewer's image displays (320); receive an overall video stream encoded with multiple image portions and multiple DM metadata portions of each of the HDR source images; etc.

The user may move the user's view directions at runtime. In some embodiments, the view direction tracker (326) comprises software, hardware, a combination of software and hardware, etc., configured to generate view direction data related to the viewer over time. The view direction tracking data may be sampled or measured at a relatively fine time scale (e.g., every millisecond, every five milliseconds, etc.). The view direction tracking data may be used to establish/determine the viewer's view directions at a given time resolution (e.g., every millisecond, every five milliseconds, etc.).

In some embodiments, the image rendering system (324-1) is configured to generate foviated video content to be rendered on the user's display. In some embodiments, multiple image portions of a foviated image in the received video stream may be applied with DM operations based on corresponding DM metadata portions and stitched/composited together to form a unified imagery (or an overall display mapped image). De-blocking operations, de-contouring operations, blurring operations, etc., may be performed as a part of compositing the unified imagery to be rendered on the user's display.

In some embodiments, the display manager (318) comprises software, hardware, a combination of software and hardware, etc., configured to perform DM operations on the foviated video content to be rendered on the image displays (320) to generate display mapped foviated video content; output the display mapped foviated video content (e.g., in an HDMI signal, etc.) to the image displays (320) for rendering; etc.

Additionally, optionally, or alternatively, some or all of image rendering operations such as view direction tracking, motion detection, position detection, rotation determination, transformation between coordinate systems, temporal dampening of time-varying image parameters, any other temporal manipulation of image parameters, display management, content mapping, tone mapping, color mapping, field-of-view management, prediction, navigations through mouse, trackball, keyboard, foot tracker, actual body motion, etc., may be performed by the image rendering system (324-1).

The image rendering system (324-1) may be used to support real time immersive video applications, near-real-time immersive video applications, non-real-time immersive video applications, real time non-immersive video applications, near-real-time non-immersive video applications, non-real-time non-immersive video applications, virtual reality, augmented reality, automobile entertainment, helmet mounted display applications, heads up display applications, games, 2D display applications, 3D display applications, multi-view display applications, etc. For example, some or all of view direction data, multiple image portions and multiple DM metadata portions generated in reference to the viewer's view directions, etc., are generated or accessed by the image rendering system (324-1) in real time, in near real time, etc.

Techniques as described herein can be implemented in a variety of system architectures. Some or all image processing operations as described herein can be implemented by one or more of cloud-based video streaming servers, video streaming servers collocated with or incorporated into video streaming clients, image rendering systems, image rendering systems, display devices, etc. Based on one or more factors such as types of video applications, bandwidth/bitrate budgets, computing capabilities, resources, loads, etc., of recipient devices, computing capabilities, resources, loads, etc., of video streaming servers and/or computer networks, etc., some image processing operations can be performed by a video streaming server, while some other image processing operations can be performed by a video streaming client, an image rendering system, a display device, etc.

Figure 3C:
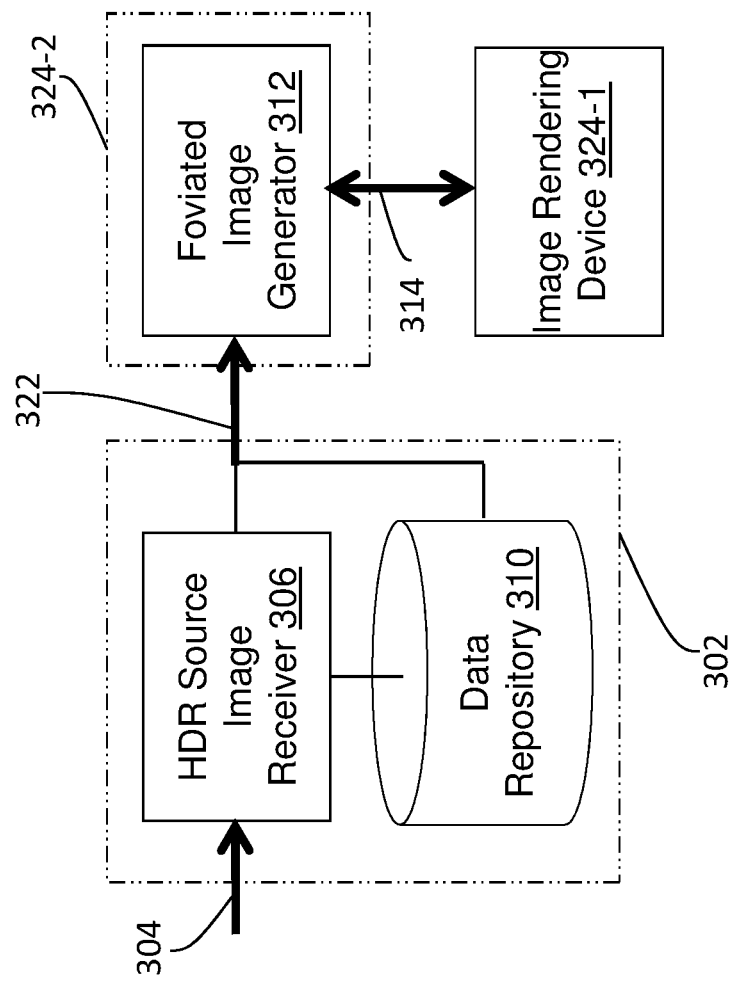

FIG. 3C illustrates an example configuration in which a foviated image generator (e.g., 312, etc.) is incorporated into an edge video streaming server 324-2. In some embodiments, a foviated image processor 302 of FIG. 3C may be cloud-based. In some embodiments, the foviated image processor (302) may be located in a core network separate from edge devices such as the edge video streaming server (324-2). As in FIG. 3A, the foviated image processor (302) may comprise an HDR source image receiver 306, a data repository 310, etc. The foviated image processor (302) may represent an upstream video streaming server that communicates with the edge video streaming server (324-2) over relatively high bitrates. Some or all of the components of the foviated image processor (302) and/or the edge video streaming server (324-2) may be implemented by one or more devices, modules, units, etc., in software, hardware, a combination of software and hardware, etc.

In some embodiments, the foviated image processor (302) is configured to output HDR source images in a data flow 322 to downstream devices one of which may be the edge video streaming server (324-2).

In some embodiments, the edge video streaming server (324-2), or the foviated image generator (312) therein, comprises software, hardware, a combination of software and hardware, etc., configured to determine a viewer's view direction over time in relation to a spatial coordinate system in which foviated video content is to be rendered in the viewer's display device; generate an overall video stream encoded with multiple image portions and multiple DM metadata portions of each of the HDR source images, etc. Different DM metadata portions may be separately and specifically generated in reference to the viewer's (e.g., determined, predicted, estimated, etc.) view direction at a time point for different image portions in an HDR source image to be rendered at the time point, and may be delivered in an image metadata set delivered along with the different image portions in the HDR source image to a downstream device via the bidirectional data flow 314 (e.g., directly or indirectly through intermediate devices, etc.).

In some embodiments, an image rendering device (e.g., 324-1), or a display manager (e.g., 318 of FIG. 2B) therein, comprises software, hardware, a combination of software and hardware, etc., configured to perform DM operations on the foviated video content to be rendered on one or more image displays to generate display mapped foviated video content; output the display mapped foviated video content (e.g., in an HDMI signal, etc.) to the image displays for rendering; etc.

The viewer may move the viewer's view directions at runtime. The image rendering system (324-2) is configured to generate foviated video content to be rendered on the viewer's display device. In some embodiments, multiple image portions of a foviated image in the received video stream may be applied with DM operations based on corresponding DM metadata portions, and stitched or composited together to form a unified imagery (or an overall display mapped image). De-blocking operations, de-contouring operations, blurring operations, etc., may be performed as a part of compositing the unified imagery to be rendered on the user's display.

8. Example Process Flows

Figure 4A:
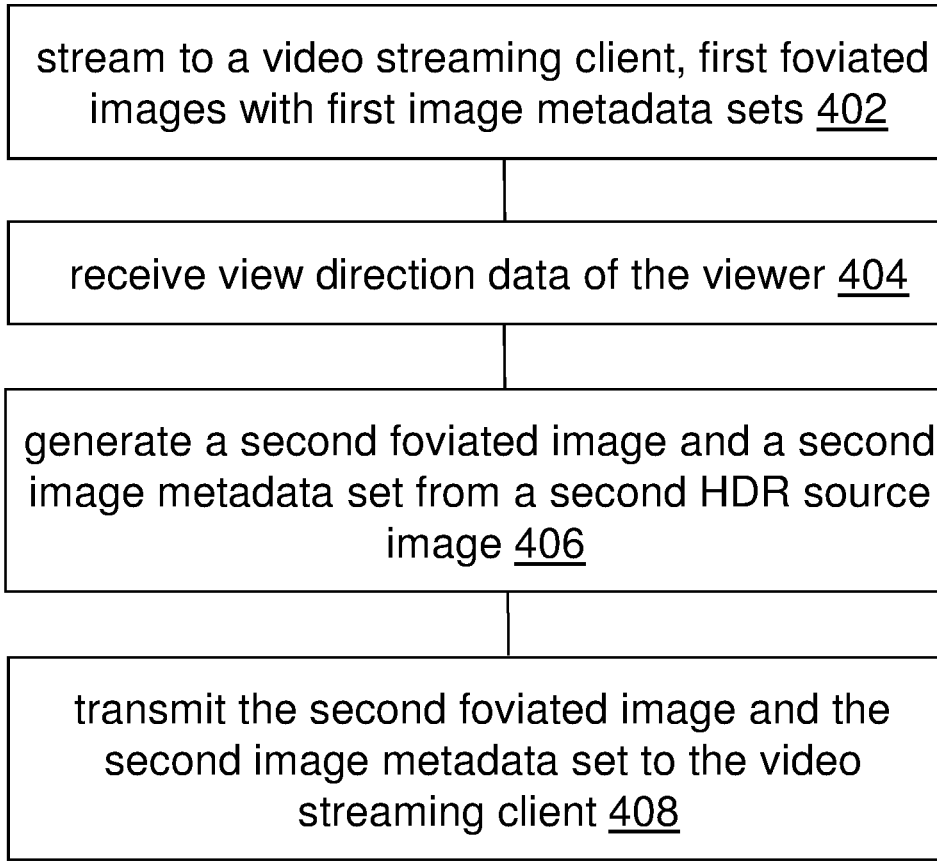

FIG. 4A illustrates an example process flow according to an example embodiment of the present invention. In some example embodiments, one or more computing devices or components may perform this process flow. In block 402, a foviated image processor (e.g., a video streaming server or a video streaming client of FIG. 3A through FIG. 3C, etc.) streams one or more first foviated images with one or more first image metadata sets to a video streaming client. The one or more first foviated images and the one or more first image metadata sets are to be used by the video streaming client to generate one or more first display mapped images for rendering to a viewer at one or more first time points. The one or more first foviated images and the one or more first image metadata sets are generated from one or more first high dynamic range (HDR) source images in reference to one or more first view directions of the viewer at the one or more first time points.

In block 404, the foviated image processor (e.g., a video streaming server or a video streaming client of FIG. 3A through FIG. 3C, etc.) receives at least a part of view direction data of the viewer collected in real time while the viewer is viewing the one or more first display mapped images. The view direction data are used to determine a second view direction of the viewer at a second time point subsequent to the one or more first time points.

In block 406, the foviated image processor generates a second foviated image and a second image metadata set from a second HDR source image in reference to the second view direction of the viewer at the second time point. The second foviated image and the second image metadata set are to be used by the video streaming client to generate a second display mapped image for rendering to the viewer at the second time point. The second foviated image has a focal-vision foviated image portion covering the second view direction of the viewer and a peripheral-vision foviated image portion outside the focal-vision image portion. The second image metadata set comprises a focal-vision display management (DM) metadata portion separately and specifically generated for adapting the focal-vision foviated image portion to a focal-vision display mapped image portion in the second display mapped image. The second image metadata set comprises a peripheral-vision DM metadata portion separately and specifically generated for adapting the peripheral-vision foviated image portion to a peripheral-vision display mapped image portion in the second display mapped image.

In block 408, the foviated image processor transmits the second foviated image and the second image metadata set to the video streaming client.

In an embodiment, the foviated image processor is further configured to perform: receiving user input (e.g., from a colorist, director, etc.) identifying a third focal-vision image portion in a third HDR source image, the third HDR source image being used to generate a third foviated image; generating a third focal-vision foviated image portion from the third focal-vision image portion as identified based on the user input in the third HDR source image; generating a third focal-vision DM metadata portion to be used by the video streaming client for adapting the third focal-vision foviated image portion to a third focal-vision display mapped image portion in a third display mapped image for rendering at a third time point; transmitting the third foviated image and a third image metadata set including the third focal-vision DM metadata to the video streaming client; etc.

In an embodiment, the foviated image processor is further configured to perform: determining, based at least in part on the view direction data, an adaptation time for the viewer to adapt to a new light adaptation level; delaying streaming full image details that correspond to the new light adaptation level in focal-vision foviated image portions in foviated images until the adaptation time is past.

In an embodiment, the adaptation time is specified in an image metadata set accompanying at least one of the foviated images that are transmitted to the video streaming client.

In an embodiment, the focal-vision DM metadata specifies a focal-vision specific maximum (e.g., peak, ceiling, etc.) luma value among all pixels represented in the focal-vision foviated image portion without identifying which pixel in the focal-vision foviated image portion is associated with the focal-vision specific maximum luma value; the peripheral-vision DM metadata specifies a peripheral-vision specific maximum luma value among all pixels represented in the peripheral-vision foviated image portion without identifying which pixel in the peripheral-vision image portion is associated with the peripheral-vision specific maximum luma value; the focal-vision specific maximum luma value is different from the peripheral-vision specific maximum luma value.

In an embodiment, the focal-vision DM metadata portion is used to adapt a reference transfer function into a focal-vision specific transfer function to be applied to generating the focal-vision display mapped image portion; the peripheral-vision DM metadata is used to adapt the same reference transfer function into a peripheral-vision specific transfer function to be applied to generating the peripheral-vision display mapped image portion; the focal-vision specific transfer function maps at least one input codeword differently from the peripheral-vision specific transfer function.

In an embodiment, grayscale levels represented in the reference transfer function correspond to finest perceptible image details encodable in a luma channel of a color space in the second HDR source image.

In an embodiment, the second image metadata set further includes other DM metadata that is used to adapt the same reference transfer function into another transfer function to be applied to generating another image portion, other than the focal-vision display mapped image portion and the peripheral-vision display mapped image portion, in the second display mapped image; the other transfer function is different from both the focal-vision specific transfer function and the peripheral-vision specific transfer function.

In an embodiment, the same reference transfer function is applied to mapping all luma values encoded in the second HDR source image to corresponding grayscale levels in reference to a reference target display.

In an embodiment, the same reference transfer function is applied to mapping all luma values encoded in a viewport of the second HDR source image to corresponding grayscale levels in reference to a reference target display.

In an embodiment, the foviated image processor is further configured to perform: predicting the viewer's light adaptation level at the second time point; determining whether the viewer's predicted light adaptation level is comparable with a to-be-adapted luminance level; in response to determining that the viewer's predicted light adaptation level is comparable with the to-be-adapted luminance level, preserving, in the focal-vision foviated image portion of the second foviated image, finest perceptible image details encoded in a first image portion of the second HDR source image, the first image portion of the second HDR source image being used to derive the focal-vision foviated image portion of the second foviated image.

As used herein, a light adaptation level at the video streaming client may be translated, mapped, estimated, approximated, etc., to a weighted aggregated light level of a zone, an image portion, an image region, etc., in a foviated image, a HDR source image, etc., based on light level information.

In an embodiment, the foviated image processor is further configured to perform: predicting the viewer's light adaptation level at the second time point; determining whether the viewer's predicted light adaptation level is comparable with a to-be-adapted luminance level; in response to determining that the viewer's predicted light adaptation level is comparable with the to-be-adapted luminance level, preserving, in the focal-vision foviated image portion of the second foviated image, finest perceptible image details with light levels around a specific light level (e.g., a translated light adaptation level for a reference display used in encoding foviated images, etc.) corresponding to the viewer's predicted light adaptation level (e.g., a light adaptation level with regards to the viewer's target display, etc.) in a first image portion of the second HDR source image, the first image portion of the second HDR source image being used to derive the focal-vision foviated image portion of the second foviated image.

In an embodiment, the foviated image processor is further configured to clip, in the focal-vision foviated image portion, one or more luma values encoded in the first image portion of the second HDR source image.

In an embodiment, a focal-vision display mapped image portion of at least one of the one or more first display mapped images represents a source zone for the viewer's light adaptation; the focal-vision display mapped image portion of the second display mapped image represents a target zone for the viewer's light adaptation.

In an embodiment, the second HDR source image represents one of: an immersive image, a panorama image, an augmented reality image, a virtual reality image, a remote presence image, etc.

In an embodiment, the focal-vision DM metadata portion specifies one or more of: the viewer's predicted light adaptation level, a focal-vision specific maximum luma value, a focal-vision specific minimum luma value, a focal-vision specific average luma value, a focal-vision specific white point, etc., in the focal-vision foviated image portion.

In an embodiment, the peripheral-vision DM metadata portion specifies one or more of: a peripheral-vision specific maximum luma value, a peripheral-vision specific minimum luma value, a peripheral-vision specific average luma value, a peripheral-vision specific white point, etc., in the peripheral-vision foviated image portion.

In an embodiment, the one or more first time points and the second time point collectively represent consecutive time points covering a time interval; luminance levels in the viewer's focal vision vary from relatively bright luminance levels (e.g., determined or estimated based on display mapped images, foviated images, or source images, etc.); a first image portion in the second HDR source image corresponds to the focal-vision foviated image portion in the second foviated image; a total number of dark levels represented in the focal-vision foviated image portion in the second foviated image is reduced relative to a total number of source dark levels represented in the first image portion in the second HDR source image.

In an embodiment, the one or more first time points and the second time point collectively represent consecutive time points covering a time interval; luminance levels in the viewer's focal vision vary from relatively bright luminance levels (e.g., determined or estimated based on display mapped images, foviated images, or source images, etc.); a first image portion in the second HDR source image corresponds to the focal-vision foviated image portion in the second foviated image; a total number of bright levels represented in the focal-vision foviated image portion in the second foviated image is reduced relative to a total number of source bright levels represented in the first image portion in the second HDR source image.

In an embodiment, the foviated image processor is further configured to perform: determining the viewer's light adaptation levels that vary over time (e.g., temporal changes, etc.); using the viewer's light adaptation levels that vary over time to predict the viewer's light adaptation level for the second time point; generating the focal-vision DM metadata portion with the viewer's predicted light adaptation level for the second time point.

In an embodiment, the viewer's light adaptation levels comprise one or more first predicted light adaptation levels of the viewer at the one or more first time points; the one or more first predicated light adaptation levels are determined at least in part based on one or more first viewing directions of the viewer at the one or more first time points and one or more first focal-vision image portions in the one or more first display mapped images.

In an embodiment, the second focal-vision image portion in the second display mapped image covers the viewer's foveal-vision up to a maximum linear angular value: between 2 and 4 degrees, between 4 and 6 degrees, between 6 and 8 degrees, etc.

FIG. 4B illustrates an example process flow according to an example embodiment of the present invention. In some example embodiments, one or more computing devices or components may perform this process flow. In block 452, a video streaming client (e.g., an image rendering system of FIG. 3B, etc.) renders, to a viewer, one or more first display mapped images at one or more first time points. The one or more first display mapped images are generated from one or more first foviated images and the one or more first image metadata sets received from a video streaming server. The one or more first foviated images and the one or more first image metadata sets are generated by the video streaming server from one or more first high dynamic range (HDR) source images in reference to one or more first view directions of the viewer at the one or more first time points.

In block 454, the video streaming client collects, in real time, view direction data of the viewer collected while the viewer is viewing the one or more first display mapped images. The view direction data are used to determine a second view direction of the viewer at a second time point subsequent to the one or more first time points.

In block 456, the video streaming client sends at least a part of the view direction data to the video streaming server to cause the video streaming server to generate a second foviated image and a second image metadata set from a second HDR source image in reference to the second view direction of the viewer at the second time point. The second foviated image and the second image metadata set are to be used to generate a second display mapped image for rendering to the viewer at the second time point. The second foviated image has a focal-vision foviated image portion covering the second view direction of the viewer and a peripheral-vision foviated image portion outside the focal-vision image portion. The second image metadata set comprises a focal-vision display management (DM) metadata portion separately and specifically generated for adapting the focal-vision foviated image portion to a focal-vision display mapped image portion in the second display mapped image. The second image metadata set comprises a peripheral-vision DM metadata portion separately and specifically generated for adapting the peripheral-vision foviated image portion to a peripheral-vision display mapped image portion in the second display mapped image.

In block 458, the video streaming client receives the second foviated image and the second image metadata set from the video streaming server.

In block 460, the video streaming client generates the second display mapped image from the second foviated image.

In block 462, the video streaming client renders at the second time point, to the viewer, the second display mapped image.

In an embodiment, the video streaming client is further configured to perform: determining, based at least in part on the view direction data, an adaptation time for the viewer to adapt to a new light adaptation level; delaying streaming full image details that correspond to the new light adaptation level in focal-vision foviated image portions in foviated images until the adaptation time is past.

In an embodiment, the adaptation time is automatically determined at runtime.

In an embodiment, the video streaming client is further configured to use phased light modulation to concentrate additional light to one or more specific pixels in the focal-vision image portion of the second display mapped image. In an embodiment, the additional light is concentrated to the one or more specific pixels in the focal-vision image portion of the second display mapped image while diverting light from one or more other pixels in the second display mapped image not in the focal-vision image portion.

In an embodiment, the video streaming client is further configured to perform: monitoring an ambient light level associated with a target display on which the one or more first display mapped images and the second display mapped image are rendered; using the ambient light level to make adjustments to one or more transfer functions that are used to map at least one foviated image to at least one display image to be rendered on the target display.

In an embodiment, the one or more first display mapped images and the second display mapped image are rendered on a target display that is configured with dimming capabilities including one or more of: global dimming capabilities, local dimming capabilities, or low count dimming capabilities.

In various example embodiments, an apparatus, a system, an apparatus, or one or more other computing devices performs any or a part of the foregoing methods as described. In an embodiment, a non-transitory computer readable storage medium stores software instructions, which when executed by one or more processors cause performance of a method as described herein.

Note that, although separate embodiments are discussed herein, any combination of embodiments and/or partial embodiments discussed herein may be combined to form further embodiments.

9. Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 5 is a block diagram that illustrates a computer system 500 upon which an example embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504.

A storage device 510, such as a magnetic disk or optical disk, solid state RAM, is provided and coupled to bus 502 for storing information and instructions.

Computer system 500 may be coupled via bus 502 to a display 512, such as a liquid crystal display, for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

10. Equivalents, Extensions, Alternatives and Miscellaneous

In the foregoing specification, example embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

ENUMERATED EXEMPLARY EMBODIMENTS

The invention may be embodied in any of the forms described herein, including, but not limited to the following Enumerated Example Embodiments (EEEs) which describe structure, features, and functionality of some portions of the present invention.

EEE 1. A method for streaming video, comprising:
streaming to a video streaming client, one or more first foviated images with one or more first image metadata sets, the one or more first foviated images and the one or more first image metadata sets to be used by the video streaming client to generate one or more first display mapped images for rendering to a viewer at one or more first time points, the one or more first foviated images and the one or more first image metadata sets being generated from one or more first high dynamic range (HDR) source images in reference to one or more first view directions of the viewer at the one or more first time points;
receiving at least a part of view direction data of the viewer collected in real time while the viewer is viewing the one or more first display mapped images, the view direction data being used to determine a second view direction of the viewer at a second time point subsequent to the one or more first time points;
generating a second foviated image and a second image metadata set from a second HDR source image in reference to the second view direction of the viewer at the second time point, the second foviated image and the second image metadata set to be used by the video streaming client to generate a second display mapped image for rendering to the viewer at the second time point, the second foviated image having a focal-vision foviated image portion covering the second view direction of the viewer and a peripheral-vision foviated image portion outside the focal-vision image portion, the second image metadata set comprising a focal-vision display management (DM) metadata portion separately and specifically generated for adapting the focal-vision foviated image portion to a focal-vision display mapped image portion in the second display mapped image, the second image metadata set comprising a peripheral-vision DM metadata portion separately and specifically generated for adapting the peripheral-vision foviated image portion to a peripheral-vision display mapped image portion in the second display mapped image;
transmitting the second foviated image and the second image metadata set to the video streaming client.

EEE 2. The method of EEE 1, further comprising:
receiving user input identifying a third focal-vision image portion in a third HDR source image, wherein the third HDR source image is used to generate a third foviated image;
generating a third focal-vision foviated image portion from the third focal-vision image portion as identified based on the user input in the third HDR source image;
generating a third focal-vision DM metadata portion to be used by the video streaming client for adapting the third focal-vision foviated image portion to a third focal-vision display mapped image portion in a third display mapped image for rendering at a third time point;
transmitting the third foviated image and a third image metadata set including the third focal-vision DM metadata to the video streaming client.

EEE 3. The method of EEE 1 or 2, further comprising:
determining, based at least in part on the view direction data, an adaptation time for the viewer to adapt to a new light adaptation level;
delaying streaming full image details that correspond to the new light adaptation level in focal-vision foviated image portions in foviated images until the adaptation time is past.

EEE 4. The method of any preceding EEE, wherein the adaptation time is specified in an image metadata set accompanying at least one of the foviated images that are transmitted to the video streaming client.

EEE 5. The method of any preceding EEE, wherein the focal-vision DM metadata specifies a focal-vision specific maximum luma value among all pixels represented in the focal-vision foviated image portion without identifying which pixel in the focal-vision foviated image portion is associated with the focal-vision specific maximum luma value, wherein the peripheral-vision DM metadata specifies a peripheral-vision specific maximum luma value among all pixels represented in the peripheral-vision foviated image portion without identifying which pixel in the peripheral-vision image portion is associated with the peripheral-vision specific maximum luma value, and wherein the focal-vision specific maximum luma value is different from the peripheral-vision specific maximum luma value.

EEE 6. The method of any preceding EEE, wherein the focal-vision DM metadata portion is used to adapt a reference transfer function into a focal-vision specific transfer function to be applied to generating the focal-vision display mapped image portion, wherein the peripheral-vision DM metadata is used to adapt the same reference transfer function into a peripheral-vision specific transfer function to be applied to generating the peripheral-vision display mapped image portion, and wherein the focal-vision specific transfer function maps at least one input codeword differently from the peripheral-vision specific transfer function.

EEE 7. The method of EEE 6, wherein grayscale levels represented in the reference transfer function correspond to finest perceptible image details encodable in a luma channel of a color space in the second HDR source image.

EEE 8. The method of EEE 6 or 7, wherein the second image metadata set further includes other DM metadata that is used to adapt the same reference transfer function into another transfer function to be applied to generating another image portion, other than the focal-vision display mapped image portion and the peripheral-vision display mapped image portion, in the second display mapped image, and wherein the other transfer function is different from both the focal-vision specific transfer function and the peripheral-vision specific transfer function.

EEE 9. The method of any one of EEEs 6 to 8, wherein the same reference transfer function is applied to mapping all luma values encoded in the second HDR source image to corresponding grayscale levels in reference to a reference target display.

EEE 10. The method of any one of EEEs 6 to 9, wherein the same reference transfer function is applied to mapping all luma values encoded in a viewport of the second HDR source image to corresponding grayscale levels in reference to a reference target display.

EEE 11. The method of any preceding EEE, further comprising:
predicting the viewer's light adaptation level at the second time point;
determining whether the viewer's predicted light adaptation level is comparable with a to-be-adapted luminance level;
in response to determining that the viewer's predicted light adaptation level is comparable with the to-be-adapted luminance level, preserving, in the focal-vision foviated image portion of the second foviated image, finest perceptible image details encoded in a first image portion of the second HDR source image, wherein the first image portion of the second HDR source image is used to derive the focal-vision foviated image portion of the second foviated image.

EEE 12. The method of any preceding EEE, further comprising:
predicting the viewer's light adaptation level at the second time point;
determining whether the viewer's predicted light adaptation level is comparable with a to-be-adapted luminance level;
in response to determining that the viewer's predicted light adaptation level is comparable with the to-be-adapted luminance level, preserving, in the focal-vision foviated image portion of the second foviated image, finest perceptible image details with light levels around a specific light level corresponding to the viewer's predicted light adaptation level in a first image portion of the second HDR source image, wherein the first image portion of the second HDR source image is used to derive the focal-vision foviated image portion of the second foviated image.

EEE 13. The method of EEE 12, further comprising:
clipping, in the focal-vision foviated image portion, one or more luma values encoded in the first image portion of the second HDR source image.

EEE 14. The method of any preceding EEE, wherein a focal-vision display mapped image portion of at least one of the one or more first display mapped images represents a source zone for the viewer's light adaptation, and wherein the focal-vision display mapped image portion of the second display mapped image represents a target zone for the viewer's light adaptation.

EEE 15. The method of any preceding EEE, wherein the second HDR source image represents one of: an immersive image, a panorama image, an augmented reality image, a virtual reality image, or a remote presence image.

EEE 16. The method of any preceding EEE, wherein the focal-vision DM metadata portion specifies one or more of: the viewer's predicted light adaptation level, a focal-vision specific maximum luma value, a focal-vision specific minimum luma value, a focal-vision specific average luma value, or a focal-vision specific white point, in the focal-vision foviated image portion.

EEE 17. The method of any preceding EEE, wherein the peripheral-vision DM metadata portion specifies one or more of: a peripheral-vision specific maximum luma value, a peripheral-vision specific minimum luma value, a peripheral-vision specific average luma value, or a peripheral-vision specific white point, in the peripheral-vision foviated image portion.

EEE 18. The method of any preceding EEE, wherein the one or more first time points and the second time point collectively represent consecutive time points covering a time interval, wherein luminance levels in the viewer's focal vision vary from relatively bright luminance levels, wherein a first image portion in the second HDR source image corresponds to the focal-vision foviated image portion in the second foviated image, wherein a total number of dark levels represented in the focal-vision foviated image portion in the second foviated image is reduced relative to a total number of source dark levels represented in the first image portion in the second HDR source image.

EEE 19. The method of any preceding EEE, wherein the one or more first time points and the second time point collectively represent consecutive time points covering a time interval, wherein luminance levels in the viewer's focal vision vary from relatively bright luminance levels, wherein a first image portion in the second HDR source image corresponds to the focal-vision foviated image portion in the second foviated image, wherein a total number of bright levels represented in the focal-vision foviated image portion in the second foviated image is reduced relative to a total number of source bright levels represented in the first image portion in the second HDR source image.

EEE 20. The method of any preceding EEE, further comprising:
   determining the viewer's light adaptation levels that vary over time;
   using the viewer's light adaptation levels that vary over time to predict the viewer's light adaptation level for the second time point;
   generating the focal-vision DM metadata portion with the viewer's predicted light adaptation level for the second time point.

EEE 21. The method of EEE 20, wherein the viewer's light adaptation levels comprise one or more first predicted light adaptation levels of the viewer at the one or more first time points, and wherein the one or more first predicated light adaptation levels are determined at least in part based on one or more first viewing directions of the viewer at the one or more first time points and one or more first focal-vision image portions in the one or more first display mapped images.

EEE 22. The method of any preceding EEE, wherein the second focal-vision image portion in the second display mapped image covers the viewer's foveal-vision up to a maximum linear angular value: between 2 and 4 degrees, between 4 and 6 degrees, or between 6 and 8 degrees.

EEE 23. A method for streaming video, comprising:
   rendering, to a viewer, one or more first display mapped images at one or more first time points, the one or more first display mapped images being generated from one or more first foviated images and the one or more first image metadata sets received from a video streaming server, the one or more first foviated images and the one or more first image metadata sets being generated by the video streaming server from one or more first high dynamic range (HDR) source images in reference to one or more first view directions of the viewer at the one or more first time points;
   collecting, in real time, view direction data of the viewer collected while the viewer is viewing the one or more first display mapped images, the view direction data being used to determine a second view direction of the viewer at a second time point subsequent to the one or more first time points;
   sending at least a part of the view direction data to the video streaming server to cause the video streaming server to generate a second foviated image and a second image metadata set from a second HDR source image in reference to the second view direction of the viewer at the second time point, the second foviated image and the second image metadata set to be used to generate a second display mapped image for rendering to the viewer at the second time point, the second foviated image having a focal-vision foviated image portion covering the second view direction of the viewer and a peripheral-vision foviated image portion outside the focal-vision image portion, the second image metadata set comprising a focal-vision display management (DM) metadata portion separately and specifically generated for adapting the focal-vision foviated image portion to a focal-vision display mapped image portion in the second display mapped image, the second image metadata set comprising a peripheral-vision DM metadata portion separately and specifically generated for adapting the peripheral-vision foviated image portion to a peripheral-vision display mapped image portion in the second display mapped image;
   receiving the second foviated image and the second image metadata set from the video streaming server;
   generating the second display mapped image from the second foviated image;
   rendering at the second time point, to the viewer, the second display mapped image.

EEE 24. The method of EEE 23, further comprising:
   determining, based at least in part on the view direction data, an adaptation time for the viewer to adapt to a new light adaptation level;
   delaying streaming full image details that correspond to the new light adaptation level in focal-vision foviated image portions in foviated images until the adaptation time is past.

EEE 25. The method of EEE 24, wherein the adaptation time is automatically determined at runtime.

EEE 26. The method of any one of EEEs 23 to 25, further comprising: using phased light modulation to concentrate additional light to one or more specific pixels in the focal-vision image portion of the second display mapped image.

EEE 27. The method of EEE 26, wherein the additional light is concentrated to the one or more specific pixels in the focal-vision image portion of the second display mapped image while diverting light from one or more other pixels in the second display mapped image not in the focal-vision image portion.

EEE 28. The method of any one of EEEs 23 to 27, further comprising:
   monitoring an ambient light level associated with a target display on which the one or more first display mapped images and the second display mapped image are rendered;
   using the ambient light level to make adjustments to one or more transfer functions that are used to map at least one foviated image to at least one display image to be rendered on the target display.

EEE 29. The method of any one of EEE 23 to 28, wherein the one or more first display mapped images and the second display mapped image are rendered on a target display that is configured with dimming capabilities including one or more of: global dimming capabilities, local dimming capabilities, or low count dimming capabilities.

EEE 30. An apparatus performing any of the methods as recited in EEEs 1-29.

EEE 31. A system performing any of the methods as recited in EEEs 1-29.

EEE 32. A non-transitory computer readable storage medium, storing software instructions, which when executed by one or more processors cause performance of the method recited in any of EEEs 1-29.

EEE 33. A computing device comprising one or more processors and one or more storage media, storing a set of instructions, which when executed by one or more processors cause performance of the method recited in any of EEEs 1-29.

The invention claimed is:

1. A method for streaming video, comprising:
   streaming to a video streaming client, one or more first foviated images with one or more first image metadata sets, the one or more first foviated images and the one or more first image metadata sets to be used by the video streaming client to generate one or more first display mapped images for rendering to a viewer at one or more first time points, the one or more first foviated images and the one or more first image metadata sets being generated from one or more first high dynamic range (HDR) source images in reference to one or more first view directions of the viewer at the one or more first time points;

receiving at least a part of view direction data of the viewer collected in real time while the viewer is viewing the one or more first display mapped images, the view direction data being used to determine a second view direction of the viewer at a second time point subsequent to the one or more first time points;

generating a second foviated image and a second image metadata set from a second HDR source image in reference to the second view direction of the viewer at the second time point, the second foviated image and the second image metadata set to be used by the video streaming client to generate a second display mapped image for rendering to the viewer at the second time point, the second foviated image having a focal-vision foviated image portion covering the second view direction of the viewer and a peripheral-vision foviated image portion outside the focal-vision image portion, the second image metadata set comprising a focal-vision display management (DM) metadata portion separately and specifically generated for adapting the focal-vision foviated image portion to a focal-vision display mapped image portion in the second display mapped image, the second image metadata set comprising a peripheral-vision DM metadata portion separately and specifically generated for adapting the peripheral-vision foviated image portion to a peripheral-vision display mapped image portion in the second display mapped image, the focal-vision DM metadata portion generated with a predicted light adaptation level of the viewer for the second time point;

transmitting the second foviated image and the second image metadata set to the video streaming client.

2. The method of claim 1, further comprising:
receiving user input identifying a third focal-vision image portion in a third HDR source image, wherein the third HDR source image is used to generate a third foviated image;
generating a third focal-vision foviated image portion from the third focal-vision image portion as identified based on the user input in the third HDR source image;
generating a third focal-vision DM metadata portion to be used by the video streaming client for adapting the third focal-vision foviated image portion to a third focal-vision display mapped image portion in a third display mapped image for rendering at a third time point;
transmitting the third foviated image and a third image metadata set including the third focal-vision DM metadata to the video streaming client.

3. The method of claim 1, further comprising:
determining, based at least in part on the view direction data, an adaptation time for the viewer to adapt to a new light adaptation level;
delaying streaming full image details that correspond to the new light adaptation level in focal-vision foviated image portions in foviated images until the adaptation time is past.

4. The method of claim 3, wherein the adaptation time is specified in an image metadata set accompanying at least one of the foviated images that are transmitted to the video streaming client.

5. The method of claim 1, wherein the viewer's light adaptation level for the second time point is predicted using one or more first predicted light adaptation levels of the viewer at the one or more first time points, and where the one or more first predicated light adaptation levels are determined at least in part based on the one or more first viewing directions of the viewer at the one or more first time points and one or more first focal-vision image portions in the one or more first display mapped images.

6. The method of claim 1, wherein the focal-vision DM metadata portion is used to adapt a reference transfer function into a focal-vision specific transfer function to be applied to generating the focal-vision display mapped image portion, wherein the peripheral-vision DM metadata is used to adapt the same reference transfer function into a peripheral-vision specific transfer function to be applied to generating the peripheral-vision display mapped image portion, and wherein the focal-vision specific transfer function is different from the peripheral-vision specific transfer function.

7. The method of claim 6, wherein grayscale levels represented in the reference transfer function correspond to finest perceptible image details encodable in a luma channel of a color space in the second HDR source image.

8. The method of claim 6, wherein the second image metadata set further includes other DM metadata that is used to adapt the same reference transfer function into another transfer function to be applied to generating another image portion, other than the focal-vision display mapped image portion and the peripheral-vision display mapped image portion, in the second display mapped image, and wherein the other transfer function is different from both the focal-vision specific transfer function and the peripheral-vision specific transfer function.

9. The method of claim 6, wherein the same reference transfer function is applied to mapping all luma values encoded in the second HDR source image to corresponding grayscale levels in reference to a reference target display.

10. The method of claim 6, wherein the same reference transfer function is applied to mapping all luma values encoded in a viewport of the second HDR source image to corresponding grayscale levels in reference to a reference target display.

11. The method of claim 1, further comprising:
predicting the viewer's light adaptation level at the second time point;
determining whether the viewer's predicted light adaptation level is at a same order of magnitude as a to-be-adapted luminance level;
in response to determining that the viewer's predicted light adaptation level is at a same order of magnitude as the to-be-adapted luminance level, preserving, in the focal-vision foviated image portion of the second foviated image, finest perceptible image details encoded in a first image portion of the second HDR source image, wherein the first image portion of the second HDR source image is used to derive the focal-vision foviated image portion of the second foviated image.

12. The method of claim 1, further comprising:
predicting the viewer's light adaptation level at the second time point;
determining whether the viewer's predicted light adaptation level is at a same order of magnitude as a to-be-adapted luminance level;
in response to determining that the viewer's predicted light adaptation level is at a same order of magnitude as the to-be-adapted luminance level, preserving, in the focal-vision foviated image portion of the second foviated image, finest perceptible image details with light levels around a specific light level corresponding to the viewer's predicted light adaptation level in a first image portion of the second HDR source image, wherein the first image portion of the second HDR source image is used to derive the focal-vision foviated image portion of the second foviated image.

13. The method of claim 12, further comprising:
clipping, in the focal-vision foviated image portion, one or more luma values encoded in the first image portion of the second HDR source image.

14. The method of claim 1, wherein a focal-vision display mapped image portion of at least one of the one or more first display mapped images represents a source zone for the viewer's light adaptation, and wherein the focal-vision display mapped image portion of the second display mapped image represents a target zone for the viewer's light adaptation.

15. The method of claim 1, wherein the second HDR source image represents one of: an immersive image, a panorama image, an augmented reality image, a virtual reality image, or a remote presence image.

16. The method of claim 1, comprising predicting the viewer's light adaptation level using a light adaptation curve.

17. The method of claim 16, the light adaptation curve being dependent on any of a light level of a source zone which the viewer was previously viewing, which intermediate zones the viewer has been transitioning, a light level of a target zone which the viewer is currently viewing or is predicted to be currently viewing at the second time point, a length of time during which the viewer's focal vision is within the source zone, and a length of time during which the viewer's focal vision is within the target zone.

18. The method of claim 16, wherein the light adaptation curve predicts the viewer's light adaptation level differently for scenes of different image contexts.

19. The method of claim 16, wherein the light adaptation curve is based on artist intent and/or user input.

* * * * *